(12) United States Patent
Sasaya et al.

(10) Patent No.: US 12,333,440 B2
(45) Date of Patent: Jun. 17, 2025

(54) SIGNAL PROCESSING APPARATUS, SIGNAL PROCESSING SYSTEM, SIGNAL PROCESSING METHOD, AND COMPUTER PROGRAM PRODUCT

(71) Applicant: KABUSHIKI KAISHA TOSHIBA, Minato-ku (JP)

(72) Inventors: Tenta Sasaya, Ota (JP); Takashi Watanabe, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 235 days.

(21) Appl. No.: 16/798,534

(22) Filed: Feb. 24, 2020

(65) Prior Publication Data

US 2020/0380281 A1    Dec. 3, 2020

(30) Foreign Application Priority Data

Jun. 3, 2019  (JP) ................. 2019-103658

(51) Int. Cl.
| | | |
|---|---|---|
| *G06N 3/084* | (2023.01) | |
| *G06N 3/04* | (2023.01) | |
| *G06N 3/08* | (2023.01) | |
| *G06V 10/30* | (2022.01) | |
| *G06V 10/764* | (2022.01) | |

(Continued)

(52) U.S. Cl.
CPC ............ *G06N 3/084* (2013.01); *G06N 3/08* (2013.01); *G06V 10/30* (2022.01); *G06V 10/764* (2022.01); *G06V 10/82* (2022.01); *G06V 10/98* (2022.01); *G06N 3/04* (2013.01); *G10L 25/21* (2013.01); *G10L 25/51* (2013.01)

(58) Field of Classification Search
CPC .......... G06V 10/98; G06V 10/30; G06N 3/08; G06N 3/04; G10L 25/21; G10L 25/51
See application file for complete search history.

(56) References Cited

U.S. PATENT DOCUMENTS 5,490,094 A * 2/1996 Heimburger ............. H04N 5/21
708/304
5,960,391 A * 9/1999 Tateishi ............... G10L 21/0272
704/232

(Continued)

OTHER PUBLICATIONS

A. Aitken, "On Least Squares and Linear Combination of Observations", Nov. 28, 1934, 7 pages.

*Primary Examiner* — Bhavesh M Mehta
*Assistant Examiner* — Edward Tracy, Jr.
(74) *Attorney, Agent, or Firm* — Oblon, McClelland, Maier & Neustadt, L.L.P.

(57) ABSTRACT

According to an embodiment, a first signal processing apparatus includes one or more hardware processors configured to function as a signal processing unit, a first signal adjustment unit, and an update unit. The signal processing unit is configured to perform first signal processing on an input signal in which a second signal is superimposed on a first signal using at least one parameter and to output a first restoration signal obtained by restoring the first signal. The first signal adjustment unit is configured to multiply at least one of the first signal and the first restoration signal by a weighting coefficient and to output a corrected first signal and a corrected first restoration signal. The update unit is configured to update the at least one parameter using an error between the corrected first signal and the corrected first restoration signal.

12 Claims, 14 Drawing Sheets

(51) Int. Cl.
*G06V 10/82* (2022.01)
*G06V 10/98* (2022.01)
*G10L 25/21* (2013.01)
*G10L 25/51* (2013.01)

(56) References Cited

U.S. PATENT DOCUMENTS

| | | | |
|---|---|---|---|
| 11,416,742 B2* | 8/2022 | Sung | G06N 3/082 |
| 2009/0028278 A1* | 1/2009 | Shi | H04B 3/32 |
| | | | 455/63.1 |
| 2010/0306129 A1* | 12/2010 | Dayanim | G06Q 40/04 |
| | | | 705/348 |
| 2011/0167454 A1* | 7/2011 | Beppu | H04N 21/4667 |
| | | | 725/46 |
| 2014/0297273 A1* | 10/2014 | Suzuki | G10L 21/0316 |
| | | | 704/225 |
| 2016/0225387 A1* | 8/2016 | Koppens | G10L 19/20 |
| 2018/0060511 A1* | 3/2018 | Sato | G16H 50/20 |
| 2018/0296745 A1* | 10/2018 | Olde | A61M 1/3656 |
| 2019/0043516 A1* | 2/2019 | Germain | G06N 3/084 |
| 2019/0294963 A1* | 9/2019 | Sasaya | G06V 10/82 |
| 2019/0370645 A1* | 12/2019 | Lee | G06N 3/063 |
| 2020/0051549 A1* | 2/2020 | Chen | G06N 3/04 |
| 2020/0311490 A1* | 10/2020 | Lee | G06V 30/194 |
| 2022/0180882 A1* | 6/2022 | Wang | G06N 3/088 |

\* cited by examiner

FIRST SIGNAL

SECOND SIGNAL

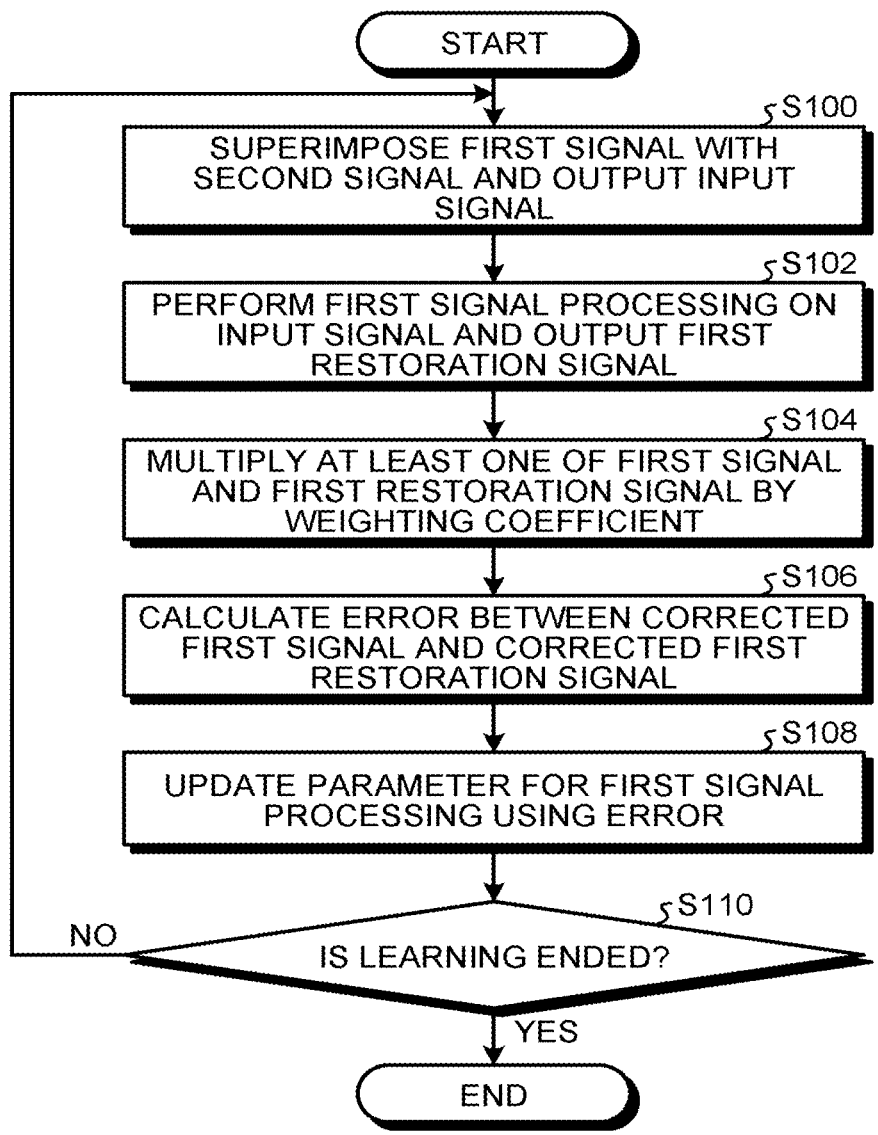

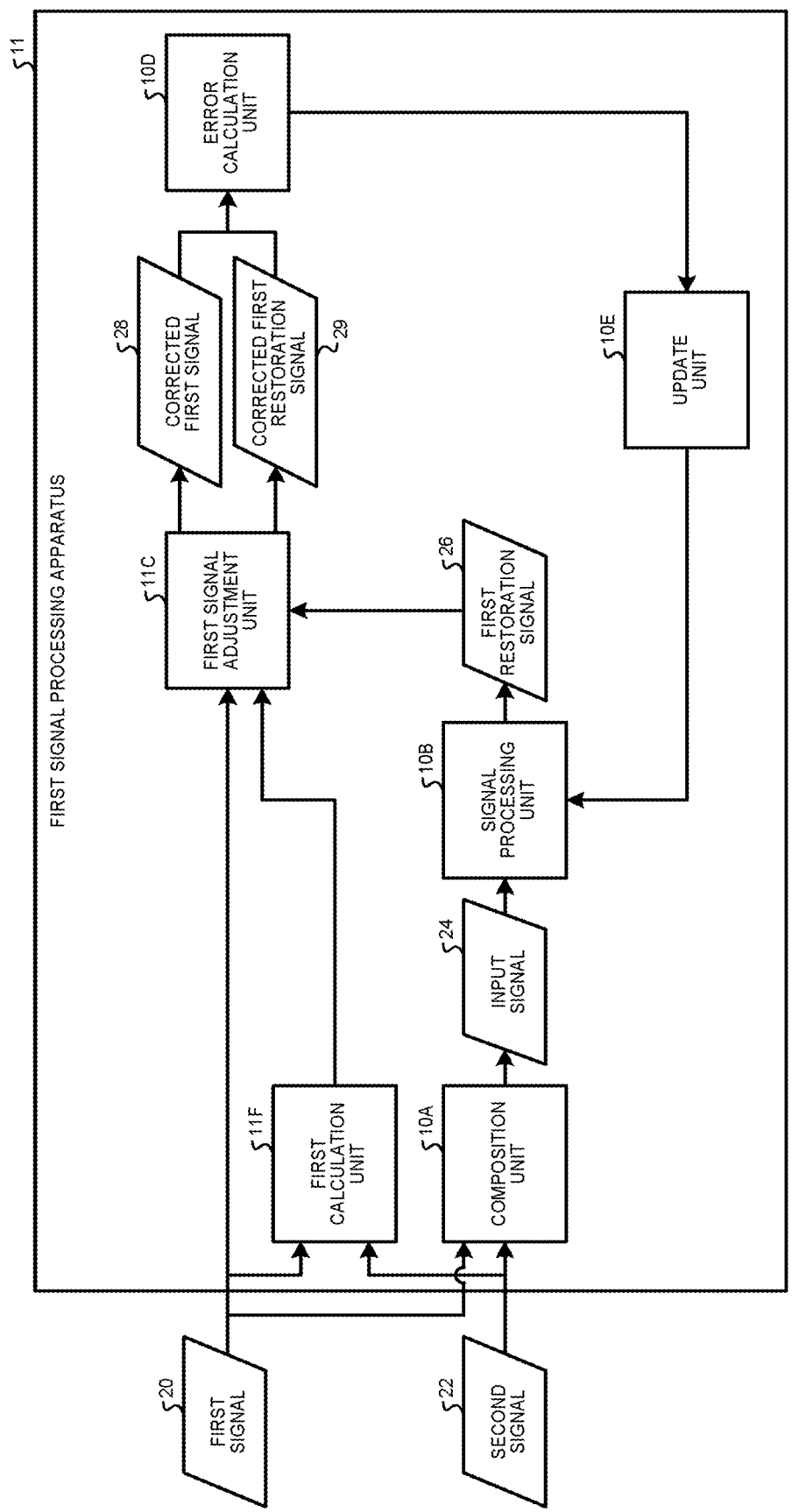

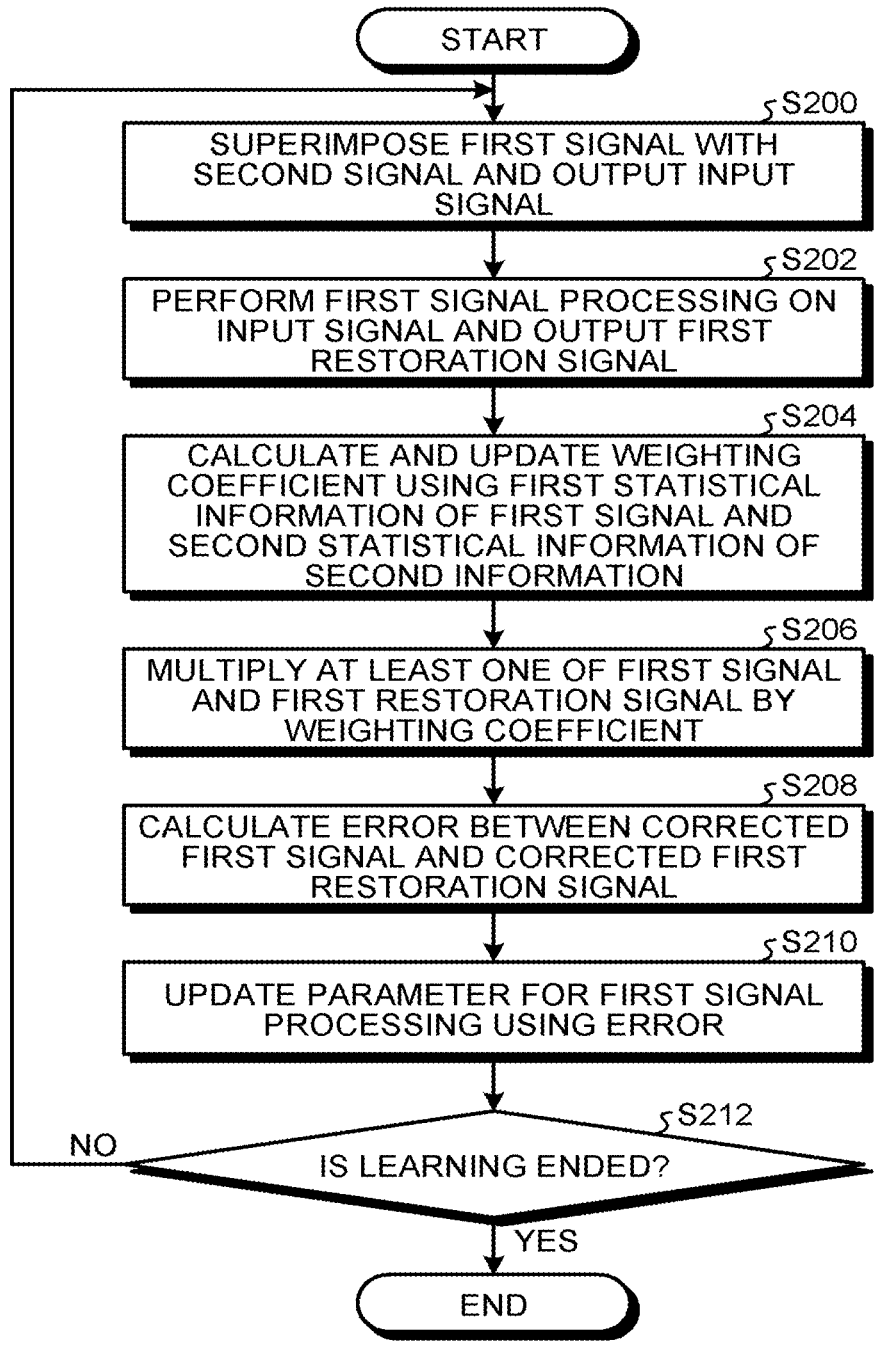

SIGNAL PROCESSING APPARATUS, SIGNAL PROCESSING SYSTEM, SIGNAL PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-103658, filed on Jun. 3, 2019; the entire contents of which are incorporated herein by reference.

FIELD

Embodiments described herein relate generally to a signal processing apparatus, a signal processing system, a signal processing method, and a computer program product.

BACKGROUND

In recent years, progress is remarkable in recognition processing of sensor signals (such as one-dimensional signals and images) using neural networks. Without being limited to academic fields, technologies of recognition processing are being increasingly applied to in industrial fields represented by autonomous driving. Many recognition processing technologies developed in academic fields, however, are directed to ideal sensor signals having a high SN ratio. Application of such technologies to industrial fields therefore needs preprocessing for suppressing (or reducing) unnecessary components (such as noise) included in a sensor signal.

With respect to such conventional technologies, however, there are cases that necessary signal components are also suppressed at the time of signal processing for suppressing unnecessary components such as noise.

BRIEF DESCRIPTION OF THE DRAWINGS

FIG. 4 is a flowchart of signal processing according to the first embodiment;

FIG. 5 is a block diagram that illustrates a functional configuration of a first signal processing apparatus according to a second embodiment;

FIG. 6 is a flowchart of signal processing according to the second embodiment;

DETAILED DESCRIPTION

According to an embodiment, a first signal processing apparatus includes one or more hardware processors configured to function as a signal processing unit, a first signal adjustment unit, and an update unit. The signal processing unit is configured to perform first signal processing on an input signal in which a second signal is superimposed on a first signal using at least one parameter and to output a first restoration signal obtained by restoring the first signal. The first signal adjustment unit is configured to multiply at least one of the first signal and the first restoration signal by a weighting coefficient and to output a corrected first signal and a corrected first restoration signal. The update unit is configured to update the at least one parameter using an error between the corrected first signal and the corrected first restoration signal. A signal processing apparatus, a signal processing system, a method of signal processing, and a computer program of the embodiments will now be described in detail with reference to the accompanying drawings.

First Embodiment

Figure 1:
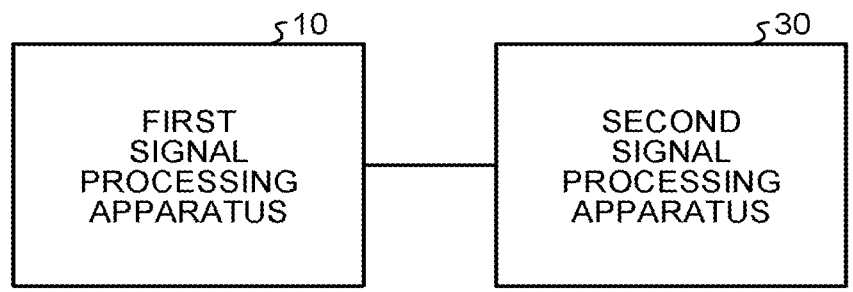
FIG. 1 is a schematic diagram of a signal processing system according to a first embodiment.

FIG. 1 is a schematic diagram of a signal processing system 1 according to a first embodiment.

The signal processing system 1 includes a first signal processing apparatus 10 and a second signal processing apparatus 30.

The first signal processing apparatus 10 and the second signal processing apparatus 30 are connected with each other to transfer data or signal therebetween. More specifically, the first signal processing apparatus 10 and the second signal processing apparatus 30 are connected with each other to transfer data or signals therebetween via wired or wireless communication. The first signal processing apparatus 10 and the second signal processing apparatus 30 may be connected with each other to transfer data or signals therebetween via another apparatus or a medium. For example, the first signal processing apparatus 10 and the second signal processing apparatus 30 may transfer data or signals therebetween with one of the signal processing apparatuses storing data in a memory medium and the other processor reading the data.

The first signal processing apparatus 10 is an example of a signal processing apparatus. The first signal processing apparatus 10 learns one or more parameters. The parameter is used for generating a first restoration signal, in other words, for restoring a first signal, contained in an input signal such as a one-dimensional signal and a multidimensional signal (such as a pixel), from the input signal. The input signal, the first signal, and the first restoration signal will be described later in detail.

The second signal processing apparatus 30 is an example of a signal processing apparatus. The second signal processing apparatus 30 provides various recognition processing on the first restoration signal.

Examples of the recognition processing include image classification, image recognition, image segmentation, image captioning, classification processing on a one-dimensional signal such as an electrical signal and vibrations, and machine translation of speech. Results of recognition processing performed by the second signal processing apparatus 30 are used for, for example, specifying the source of the input signal (for example, a failure portion of the apparatus), and the operation state of the source of the input signal (for example, the failure state).

The first signal processing apparatus 10 and the second signal processing apparatus 30 may be configured as physically separate apparatuses. The first signal processing apparatus 10 and the second signal processing apparatus 30 may be integrally configured. Functions of at least one of the first signal processing apparatus 10 and the second signal processing apparatus 30 may be dispersedly implemented by a plurality of physically separate apparatuses. For example, at least some of the functions of the first signal processing apparatus 10 may be managed by a cloud server that executes various processing through cloud computing.

In the first embodiment, the first signal processing apparatus 10 will be described.

Figure 2:
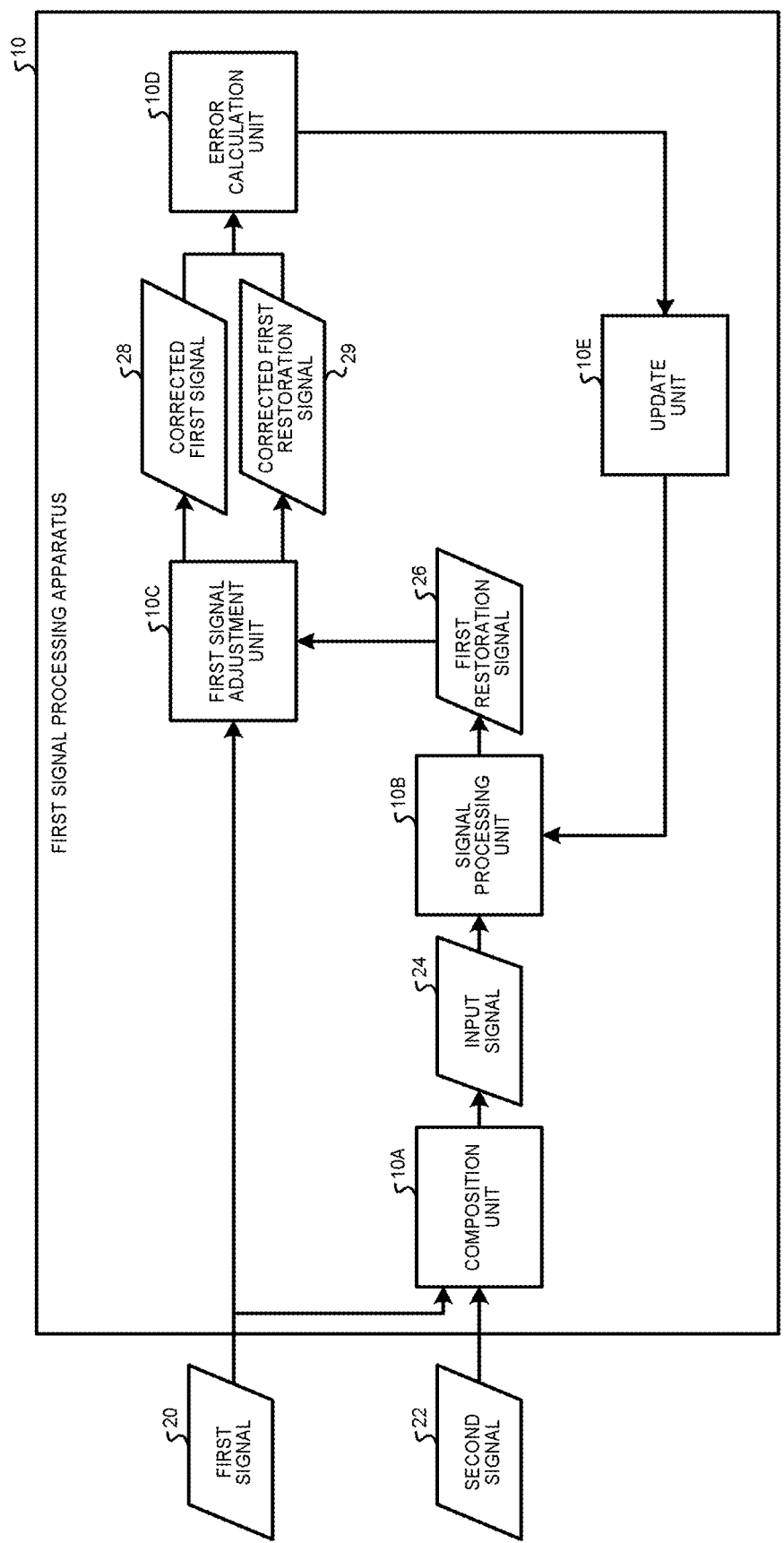
FIG. 2 is a block diagram that illustrates a functional configuration of a first signal processing apparatus according to the first embodiment.

FIG. 2 is a block diagram that illustrates an example of a functional configuration of the first signal processing apparatus 10. The first signal processing apparatus 10 includes a composition unit 10A, a signal processing unit 10B, a first signal adjustment unit 10C, an error calculation unit 10D, and an update unit 10E.

The composition unit 10A, the signal processing unit 10B, the first signal adjustment unit 10C, the error calculation unit 10D, and the update unit 10E are implemented by, for example, one processor or a plurality of processors. The above units may be implemented by causing a processor, such as a central processing unit (CPU), to execute a computer program, which means, by software, or may be implemented by a processor such as a dedicated integrated circuit (IC), which means, by hardware. The units may be implemented by a combination of software and hardware. In using a plurality of processors, each processor may implement one of the units or may implement two or more units.

The composition unit 10A superimposes a second signal 22 on a first signal 20 and outputs an input signal 24.

The first signal 20 and the second signal 22 are one-dimensional signals or multidimensional signals. Examples of one-dimensional signal include an acoustic signal and an electrical signal. Examples of multidimensional signal include an image signal and a voice signal. The one-dimensional signal and multidimensional signal may be any signals other than the above signals. The first signal 20 may be a plurality of one-dimensional signals or multidimensional signals in which an image or voice is divided at certain intervals (such as frames). The one-dimensional and the multidimensional signals may be time series signals.

The first signal 20 is a necessary component used by the second signal processing apparatus 30 for recognition processing. The second signal 22 is a component unnecessary for the recognition processing of the second signal processing apparatus 30. In other words, the second signal 22 is a signal other than the necessary component, or the first signal 20, contained in the input signal 24. For example, the second signal 22 may be a noise component.

In this embodiment, the first signal 20 is sparser than the second signal 22. The fact that the first signal 20 is sparser than the second signal 22 means that the section in which the first signal 20 is present is shorter than the section in which the second signal 22 is present, or means that the ratio between the value of a signal peak and the mean of values of a noise region in the first signal 20 is greater than the ratio between the value of a signal peak and the mean of values of a noise region in the second signal.

Figure 3A:
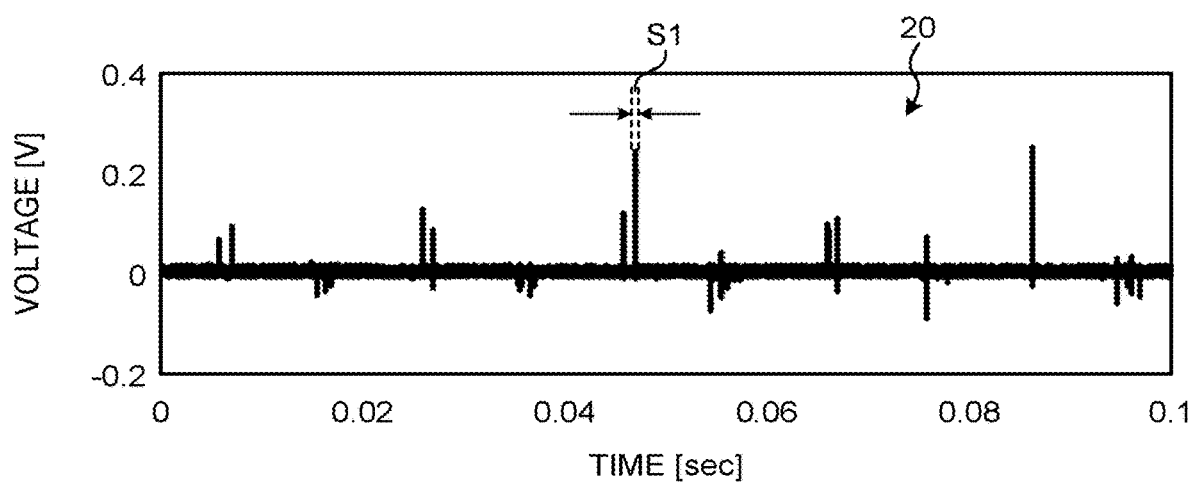
FIG. 3A is an example of a first signal according to the first embodiment.
Figure 3B:
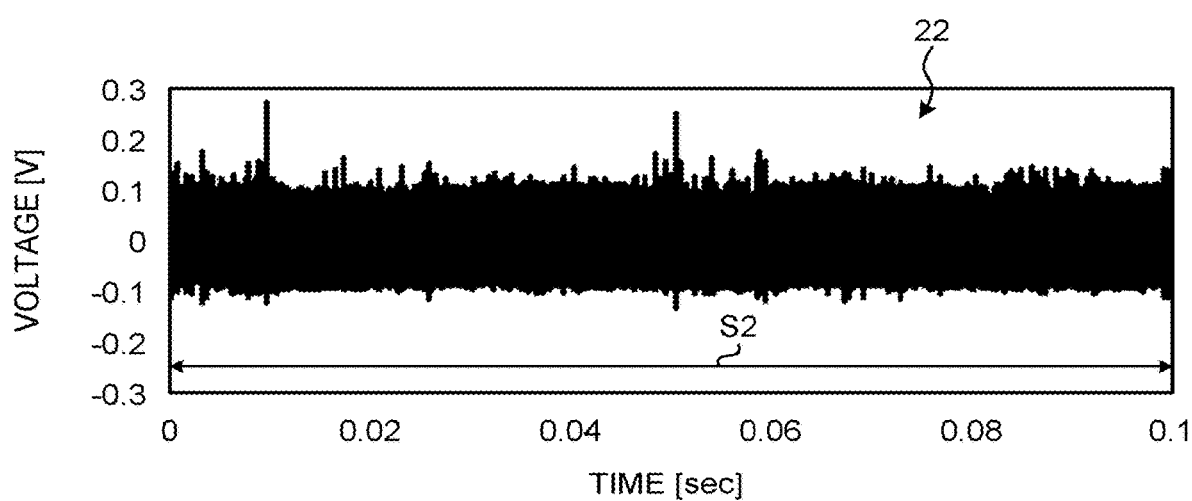
FIG. 3B is an example of a second signal according to the first embodiment.

FIG. 3A illustrates an example of the first signal 20. FIG. 3B illustrates an example of the second signal 22. As illustrated in FIG. 3A and FIG. 3B, a section S1 in which the first signal 20 is present is shorter than a section S2 in which the second signal 22 is present. The first signal 20 has large values (signal strength) at some points (or positions) (timewise points) and has values (signal strength) of zero or close to zero at other points.

Compared to the first signal 20, the second signal 22 is dense. The second signal 22 being denser than the first signal 20 means that the section in which the second signal 22 is present is longer than the section in which the first signal 20 is present, or means that an interval between signal peaks is shorter than that of the first signal 20.

The second signal 22 is large compared to the first signal 20 in at least one of the power, the amplitude, and the variance. Given that the second signal 22 is a noise component, the input signal 24 as a composite signal (superimposed signal) of the first signal 20 and the second signal 22 has a high noise level (a small SN ratio).

The composition unit 10A superimposes the second signal 22 on the first signal 20 and generates the input signal 24 as a composite signal of the first signal 20 and the second signal 22. The composition unit 10A may combine the first signal 20 and the second signal 22 using a known method to generate the input signal 24.

The signal processing unit 10B generates a first restoration signal 26 by restoring the first signal 20 included in the input signal 24. More specifically, the signal processing unit 10B performs first signal processing on the input signal 24, in which the second signal 22 is superimposed on the first signal 20, using at least one parameter and outputs the first restoration signal 26 obtained by restoring the first signal 20.

In the first embodiment, the signal processing unit 10B performs the first signal processing on the input signal 24 using at least one parameter and outputs the first restoration signal 26.

The first signal processing is to generate the first restoration signal 26 by restoring the first signal 20 included in the input signal 24. More specifically, the first signal processing is a combination of linear transformation and nonlinear transformation on the input signal 24. The first signal processing is signal processing using a neural network. The signal processing unit 10B performs the first signal processing with a neural network approach that uses, for example, convolutional layers, the activation function, and the batch normalization.

The neural network is a function that outputs a desired signal y from an input signal x using a combination of linear transformation that uses a network parameter W (weight matrix) and nonlinear transformation that uses the activation function. The network parameter W is an example of a parameter, and is a parameter of a neural network by which the first signal processing is performed. This function is expressed by the following formula (A).

$$y = F(W, x) \qquad (A)$$

In the formula (A), x denotes the input signal 24, and y denotes the first restoration signal 26, and W denotes a network parameter W (weight matrix).

The first signal processing may be any restoration processing that generates the first restoration signal 26 from the input signal 24, and is not limited to signal processing using a neural network. For example, the first signal processing may be restoration processing using a filter, for example, a low-pass filter such as the Gaussian filter and the Median filter. If the multidimensional signal is an image, a handcrafting method, such as block matching and 3D collaborative filtering (BM3D) may be applicable.

In the first embodiment, the signal processing unit 10B generates the first restoration signal 26 from the input signal 24 by performing the first signal processing using a neural network.

The first restoration signal 26 is generated with the signal processing unit 10B restoring the first signal 20 included in the input signal 24. The first restoration signal 26 is a one-dimensional or multidimensional signal, and the dimensions and the number of dimensions are the same as those of the first signal 20.

The first signal adjustment unit 10C multiplies at least one of the first signal 20 and the first restoration signal 26 by a weighting coefficient, and outputs a corrected first signal 28 and a corrected first restoration signal 29.

Signals output from the first signal adjustment unit 10C will be referred to as the corrected first signal 28 and the corrected first restoration signal 29. If the first signal 20 is multiplied by a weighting coefficient whereas the first restoration signal 26 is not multiplied by any weighting coefficients, the first signal adjustment unit 10C outputs the corrected first signal 28, which is the first signal 20 multiplied by the weighting coefficient, and outputs the corrected first restoration signal 29, which is the first restoration signal 26 not multiplied by weighting coefficients. On the contrary, if the first signal 20 is not multiplied by any weighting coefficients whereas the first restoration signal 26 is multiplied by a weighting coefficient, the first signal adjustment unit 10C outputs the corrected first signal 28, which is the first signal 20 not multiplied by weighting coefficients, and outputs the corrected first restoration signal 29, which is the first restoration signal 26 multiplied by the weighting coefficient.

The weighting coefficient is used to make the error between the first signal 20 and the first restoration signal 26 larger than the signal strength of the second signal 22 contained in the input signal 24. In other words, the weighting coefficient allows the signal processing of the signal processing unit 10B to output the first restoration signal 26 in which the first signal 20 of the input signal 24 is maintained, while output of the second signal 22, as signal components of the input signal 24 other than the first signal 20, is controlled.

A weighting coefficient is therefore predetermined in a manner to satisfy the above relation. The weighting coefficient may be a vector or a matrix with coefficients arranged on the main diagonal.

Given that the error satisfying the above relation can be obtained by multiplying the first signal 20 by a certain weighting coefficient, the first signal adjustment unit 10C outputs the corrected first signal 28, obtained by multiplying the first signal 20 by the weighting coefficient, and outputs the corrected first restoration signal 29, which is the first restoration signal 26.

Given that the error satisfying the above relation can be obtained by multiplying the first restoration signal 26 by a certain weighting coefficient, the first signal adjustment unit 10C outputs the corrected first restoration signal 29, obtained by multiplying the first restoration signal 26 by the weighting coefficient, and outputs the corrected first signal 28, which is the first signal 20.

Given that the error satisfying the above relation can be obtained by multiplying the first signal 20 and the first restoration signal 26 by certain respective weighting coefficients, the first signal adjustment unit 10C outputs the corrected first signal 28, obtained by multiplying the first signal 20 by a weighting coefficient set for the first signal 20, and outputs the corrected first restoration signal 29, obtained by multiplying the first restoration signal 26 by another weighting coefficient for the first restoration signal 26.

The error calculation unit 10D calculates the error between the corrected first signal 28 and the corrected first restoration signal 29.

For example, the error calculated by the error calculation unit 10D may be the square error between the corrected first signal 28 and the corrected first restoration signal 29. The error calculation unit 10D calculates the error, for example, using the following formula (1).

$$E(W) = \|kt - F(W,x)\|_2^2 \qquad (1)$$

In the formula (1), E(W) denotes the error, k denotes the weighting coefficient, and t denotes the first signal 20. The term kt is therefore the corrected first signal 28, and F(W,x) is the first restoration signal 26, as defined in the above formula (A).

Although the formula (1) gives an example in which the first signal 20 is multiplied by a weighting coefficient by the first signal adjustment unit 10C, at least one of the first signal 20 and the first restoration signal 26 may be multiplied by the weighting coefficient (k), as described above. In this case, in the formula (1), the error is given by replacing "kt" with "t" and "F(W,x)" with "F(W,x)t".

When the first signal adjustment unit 10C uses two or more weighting coefficients, the error calculation unit 10D calculates the error using the following formula (2) that uses a matrix K where weighting coefficients are arranged on the main diagonal.

$$E(W) = \|Kt - F(W,x)\|_2^2 \qquad (2)$$

In the formula (2), E(W) denotes the error, K denotes a matrix of weighting coefficients, and t denotes the first signal 20. The term kt is therefore the corrected first signal 28, and F(W,x) is the first restoration signal 26, as defined in the above formula (A).

The error calculation unit 10D outputs the calculated error to the update unit 10E.

The error calculation unit 10D calculates the error between the corrected first signal 28 and the corrected first restoration signal 29 by any method, and the calculated error is not limited to a squared error (L2 loss). For example, the error calculation unit 10D may calculate the L1 loss, the Charbonnier loss, and the Huber loss between the corrected first signal 28 and the corrected first restoration signal 29, as the error.

The update unit 10E updates a parameter for the first signal processing using the error calculated by the error calculation unit 10D. More specifically, the update unit 10E updates the network parameter W for the neural network using the error E(W).

The update unit 10E updates the network parameter W for the neural network by, for example, the gradient method.

The update unit 10E updates the network parameter W by the gradient method that uses a gradient ($\sigma E(W)/\sigma W$)

obtained by the partial derivative of the error E(W) with respect to the network parameter W. Since the error E(W) has a nested structure including the activation function, the gradient of the error may be calculated by the error backpropagation in terms of more efficient partial derivative. A gradient may be calculated by any method, without being limited to the error backpropagation.

For example, the update unit 10E updates the network parameter W using the following formula (3). The formula (3) is an example to update the network parameter by the simplest gradient method.

$$W' = W - \eta \frac{\partial E(W)}{\partial W} \quad (3)$$

In the formula (3), W' represents an updated network parameter W, and η represents a learning rate to determine the level at which the network parameter W is changed at one update.

The signal processing unit 10B performs the above first signal processing on the input signal 24 using the parameter (network parameter W) updated by the update unit 10E and outputs the first restoration signal 26 obtained by restoring the first signal 20.

In the first signal processing apparatus 10, the composition unit 10A, the signal processing unit 10B, the first signal adjustment unit 10C, the error calculation unit 10D, and the update unit 10E repeat the above processing cycle. With the first signal adjustment unit 10C repeatedly performing the above processing, the parameter is updated and optimized (learned).

An example flow of signal processing performed by the first signal processing apparatus 10 will now be described. The signal processing performed by the first signal processing apparatus 10 is parameter learning processing.

FIG. 4 is a flowchart of example signal processing performed by the first signal processing apparatus 10.

The composition unit 10A superimposes the first signal 20 with the second signal 22 and outputs the input signal 24 (Step S100).

The signal processing unit 10B performs the first signal processing on the input signal 24 using a parameter updated by the update unit 10E and outputs the first restoration signal 26 (Step S102).

The first signal adjustment unit 10C multiplies at least one of the first signal 20, used for generation of the input signal 24 at Step S100, and the first restoration signal 26, output at Step S102, by a weighting coefficient (Step S104). After the processing of Step S104, the first signal adjustment unit 10C outputs the resulting corrected first signal 28 and the corrected first restoration signal 29 to the error calculation unit 10D.

The error calculation unit 10D calculates the error between the corrected first signal 28 and the corrected first restoration signal 29 (Step S106).

The update unit 10E updates a parameter to be used in the first signal processing by the signal processing unit 10B, using the error calculated at Step S106 (Step S108).

The first signal processing apparatus 10 determines whether to end learning of the parameter (Step S110). For example, the first signal processing apparatus 10 makes the determination of Step S110, based on whether the number of repetitions of the processing flow from Step S100 to Step S108 reaches a predetermined value. If the determination is negative at Step S110 (No at Step S110), the processing returns to Step S100. If the determination is positive at Step S110 (Yes at Step S110), this routine ends.

As described above, the first signal processing apparatus 10 of the first embodiment includes the signal processing unit 10B, the first signal adjustment unit 10C, the error calculation unit 10D, and the update unit 10E. The signal processing unit 10B performs the first signal processing on the input signal 24 in which the second signal 22 is superimposed on the first signal 20, using at least one parameter, and outputs the first restoration signal 26 obtained by restoring the first signal 20. The first signal adjustment unit 10C multiplies at least one of the first signal 20 and the first restoration signal 26 by a weighting coefficient and outputs the corrected first signal 28 and the corrected first restoration signal 29. The update unit 10E updates the parameter based on the error between the corrected first signal 28 and the corrected first restoration signal 29.

Conventionally, the error between the first signal 20 and the first restoration signal 26 has been calculated with neither the first signal 20 nor the first restoration signal 26 multiplied by a weighting coefficient, and the parameter has been learned (optimized) based on this error.

The following formula (4) has been used to calculate the error.

$$E(W) = \|t - F(W,x)\|_2^2 \quad (4)$$

In the formula (4), E(W), t, and F(W,x) are in common with the formula (A).

For the error E(W), methods using a squared error or a weighted squared error are conventionally known. These methods use the sum of the squared errors of data pieces weighted by data variance or the like, as the error E(W). The error is given by the following formula (5), in which the formula (4) is rewritten in the generalized least squares.

$$E(W) = (y - F(W,x))^T \Omega^{-1} (y - F(W,x)) \quad (5)$$

In the formula (5), E(W), y, and F(W,x) are in common with the formula (A). In the formula (5), Ω denotes a matrix having variance on the main diagonal.

As seen in the formulas (4) and (5), conventionally, multiplication of at least one of the first signal 20 and the first restoration signal 26 by a weighting coefficient, as described in the first embodiment, has not been used for calculation of the error E(W).

With such conventional methods, if the noise level is high (for example, the SN ratio (S/N) is smaller than 1) and the necessary component (for example, the first signal 20) is sparser than the unnecessary components (for example, the second signal 22) such as noise, the parameter is problematically updated in the way to suppress both unnecessary and necessary signal components.

Furthermore, in conventional methods using the weighted least squared error for the parameter, errors of when the signal component is suppressed and when the noise component is not sufficiently suppressed are both weighted. The methods are therefore likely to update the parameter in the way to suppress both necessary and unnecessary signal components, such as noise.

Conventionally, restoration processing of restoring a necessary component (for example, the first signal 20) included in the input signal 24 is long studied, and there are many effective methodologies for general cases with noise strength smaller than the signal strength. However, an effective methodology is not established for the case with the significantly low SN ratio such as the case with noise strength larger than signal strength.

The scenario of the SN ratio of a signal becoming significantly low is exemplified as below.

The target signal is weak because the measurement aims at early finding or indication detection.

Noise increases due to a constrained measurement time and environment-specific external disturbances.

The first signal processing apparatus 10 of the first embodiment corrects the parameter to be used by the signal processing unit 10B when deriving the first restoration signal 26 obtained by restoring the first signal 20 from the input signal 24, using the error between the corrected first signal 28 and the corrected first restoration signal 29. The corrected first signal 28 and the corrected first restoration signal 29 are signals obtained by multiplying at least one of the first signal 20 and the first restoration signal 26 by a weighting coefficient.

The first signal processing apparatus 10 updates the parameter using the error between the corrected first signal 28 and corrected first restoration signal 29 multiplied by the weighting coefficient, instead of using the error between the first signal 20 and the first restoration signal 26.

The first signal processing apparatus 10 of the first embodiment thus can adjust the ratio in E(W), more specifically, the ratio between the error calculated when the first signal 20 is suppressed and the error when the second signal 22 is not sufficiently suppressed, by adjusting the weighting coefficient.

The first signal processing apparatus 10, by using the parameter updated based on the error E(W), can learn the parameter for performing signal processing that suppresses (or reduces) the signal components of the second signal 22 while preventing suppression of the signal component of the first signal 20 at the time of signal processing of the input signal 24. Namely, the first signal processing apparatus 10, because capable of learning the parameter, attains prevention of suppressing the signal component of the first signal 20 as a necessary component included in the input signal 24 and attains suppressing the signal components of the second signal 22 as components other than the necessary component included in the input signal 24 at the time of signal processing of the input signal 24.

Accordingly, the first signal processing apparatus 10 of the first embodiment can prevent the necessary signal component (the first signal 20) from being suppressed at the time of signal processing of suppressing unnecessary components (the second signal 22) included in the input signal 24.

The second signal 22 is large compared to the first signal 20 in at least one of the power, the amplitude, and the variance. The first signal 20 is sparser than the second signal 22.

In failure diagnosis of manufacturing apparatuses and infrastructure facilities by detection of abnormal signals, early detection is desired considering their natures. As such, there is a case that the noise level is high (for example, S/N<1) and the abnormal signal is sparse. With conventional methods, however, in causing a neural network to learn detecting such a signal, optimization of a squared error as the loss function, which is used in general, may lead to an undesired solution that not only the noise component is suppressed, but also the signal component is suppressed. Use of a weighted least squared error as the loss function also results in such an undesired solution.

By contrast, the error calculation unit 10D of the first embodiment updates the parameter using the error between the corrected first signal 28 and the corrected first restoration signal 29 multiplied by a weighting coefficient, instead of using the error between the first signal 20 and the first restoration signal 26.

Despite the fact that the second signal 22 is large compared to the first signal 20 in at least one of the power, the amplitude, and the variance and that the first signal 20 is sparser than the second signal 22, the technique of the first embodiment can prevent the first signal 20 from being suppressed at the time of the signal processing.

In the first embodiment, as an example configuration, the signal processing unit 10B, the update unit 10E, and the error calculation unit 10D are separately provided (see FIG. 2). At least two of the signal processing unit 10B, the update unit 10E, and the error calculation unit 10D may be integrally provided.

Second Embodiment

In the first embodiment, as an example, the weighting coefficient by which at least one of the first signal 20 and the first restoration signal 26 is multiplied is preset in a manner to satisfy the above relation.

In the second embodiment, the weighting coefficient is calculated based on the first signal 20 and the second signal 22.

FIG. 5 is a block diagram that illustrates an example of a functional configuration of a first signal processing apparatus 11. The first signal processing apparatus 11 is an example of a signal processing apparatus.

As described above, the first signal processing apparatus 11 includes the composition unit 10A, the signal processing unit 10B, a first signal adjustment unit 11C, the error calculation unit 10D, the update unit 10E, and a first calculation unit 11F.

The first signal processing apparatus 11 has the same configuration as that of the first signal processing apparatus 10 of the first embodiment, except that the first calculation unit 11F is further included and that the first signal adjustment unit 11C replaces the first signal adjustment unit 10C. Other functions are the same as those illustrated in FIG. 2, the block diagram of the first signal processing apparatus 10 of the first embodiment. Like components are therefore indicated by like reference numerals, and repeated description thereof will be omitted.

The first calculation unit 11F calculates the weighting coefficient based at least on one of first statistical information of the first signal 20 and second statistical information of the second signal 22.

The first statistical information is statistical information of the first signal 20. The second statistical information is statistical information of the second signal 22. The first statistical information and the second statistical information indicate mean square values of at least one of the power, the amplitude, and the variance, of the respective first signal 20 and the second signal 22 in the signal processing.

Specifically, if the first statistical information and the second statistical information indicate the power of the respective first signal 20 and second signal 22, the first calculation unit 11F calculates the power of the received first signal 20 as the first statistical information of the first signal 20 and calculates the power of the received second signal 22 as the second statistical information of the second signal 22.

If the first statistical information and the second statistical information indicate the amplitude of the respective first signal 20 and second signal 22, the first calculation unit 11F calculates the maximum value or the mean value of the amplitude per unit time of the received first signal 20 as the first statistical information of the first signal 20. The first calculation unit 11F further calculates the maximum value of the amplitude per unit time of the received second signal 22 as the second statistical information of the second signal 22.

If the first statistical information and the second statistical information indicate the variance or the standard deviation of the respective first signal 20 and second signal 22, the first calculation unit 11F calculates the variance or the standard deviation demonstrated by the histogram of the received first signal 20 as the first statistical information of the first signal 20. The first calculation unit 11F further calculates the variance or the standard deviation demonstrated by the histogram of the received second signal 22 as the second statistical information of the second signal 22.

The first calculation unit 11F calculates a weighting coefficient by which the above relation described in the first embodiment is satisfied, based at least on one of the first statistical information and the second statistical information.

For example, the first calculation unit 11F may calculate the ratio between the first statistical information and the second statistical information as the weighting coefficient. The first calculation unit 11F may calculate the ratio of the second statistical information to the first statistical information or the ratio of the first statistical information to the second statistical information as the weighting coefficient. The first calculation unit 11F then outputs the resulting weighting coefficient to the first signal adjustment unit 11C.

The first signal adjustment unit 11C multiplies at least one of the first signal 20 and the first restoration signal 26 by the weighting coefficient calculated by the first calculation unit 11F and outputs the corrected first signal 28 and the corrected first restoration signal 29 to the error calculation unit 10D.

The processing performed by the first signal adjustment unit 11C is the same as that performed by the first signal adjustment unit 10C of the first embodiment, except that the weighting coefficient received from the first calculation unit 11F is used instead of a predetermined weighting coefficient.

An example flow of signal processing performed by the first signal processing apparatus 11 will now be described. The signal processing performed by the first signal processing apparatus 11 is parameter learning processing.

FIG. 6 is a flowchart of example signal processing performed by the first signal processing apparatus 11.

Steps S200 to S202 are the same as Steps S100 to S102 of the first signal processing apparatus 10 of the first embodiment (see FIG. 4). Description thereof thus will be omitted.

The first calculation unit 11F calculates the first statistical information and the second statistical information of the respective first signal 20 and second signal 22, which are used for generation of the input signal 24 at Step S200. With the first statistical information and the second statistical information, the first calculation unit 11F calculates and updates a weighting coefficient to be used by the first signal adjustment unit 11C (Step S204).

The first signal adjustment unit 11C multiplies at least one of the first signal 20, used for generation of the input signal 24 at Step S200, and the first restoration signal 26, output at Step S202, by the weighting coefficient calculated and updated at Step S204 (Step S206).

The first signal processing apparatus 11 then performs the processing of Steps S206 to S212 and ends this routine. Steps S206 to S212 are the same as Steps S104 to S110 in the first signal processing apparatus 10 of the first embodiment (see FIG. 4). Description thereof thus will be omitted.

As described above, in the first signal processing apparatus 11 of the second embodiment, the first calculation unit 11F calculates the weighting coefficient based at least on one of the first statistical information of the first signal 20 and the second statistical information of the second signal 22. The first signal adjustment unit 11C multiplies at least one of the first signal 20 and the first restoration signal 26 by the weight coefficient calculated by the first calculation unit 11F.

The first signal processing apparatus 11 of the second embodiment can therefore calculate and update the weighting coefficient in a dynamic fashion such that the weighting coefficient satisfies the above relation, using the first signal 20 and the second signal 22.

If the first restoration signal 26 that is consistent with the first signal 20 cannot be restored from the input signal 24, the weighting coefficient satisfying the above relation makes the error between the first signal 20 and the first restoration signal 26 larger than the signal strength of the second signal 22 contained in the input signal 24. The weighting coefficient satisfying the above relation is used for suppressing outputting of a first restoration signal 26 in which the first signal 20 of the input signal 24 is suppressed together with the outputting of the second signal 22 as a signal component of the input signal 24 other than the first signal 20 at the signal processing by the signal processing unit 10B.

In addition to the effects of the first embodiment, the first signal processing apparatus 11 of the second embodiment can further attain both the suppression of unnecessary components (the second signal 22) of the input signal 24 and the prevention of suppressing the necessary signal component (the first signal 20) of the input signal 24.

Third Embodiment

In the first embodiment, as an example, the weighting coefficient by which at least one of the first signal 20 and the first restoration signal 26 is multiplied is predetermined in a manner to satisfy the above relation.

In a third embodiment, the weighting coefficient is calculated based on the error calculated by the error calculation unit 10D.

Figure 7:
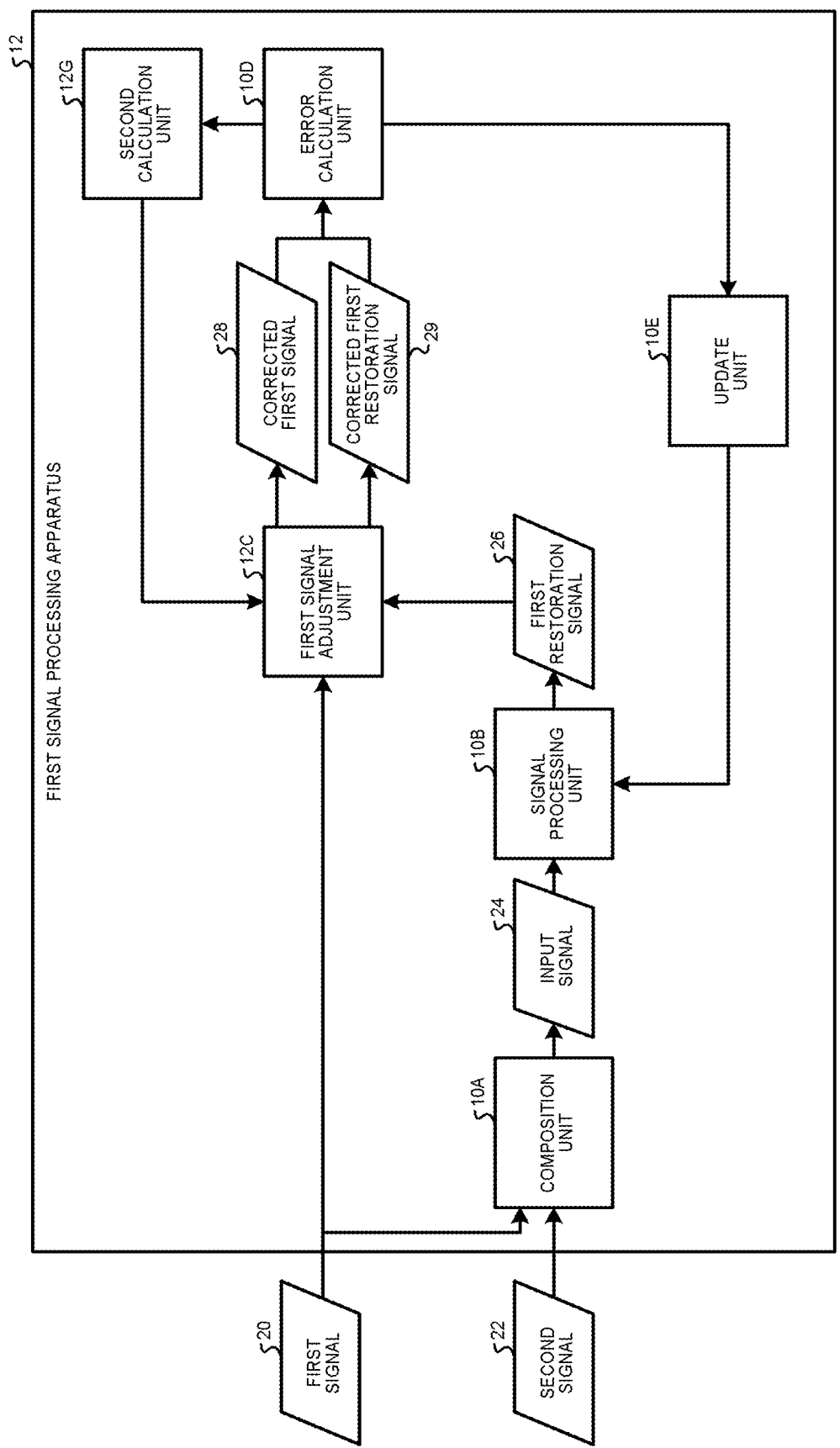
FIG. 7 is a block diagram that illustrates a functional configuration of a first signal processing apparatus according to a third embodiment.

FIG. 7 is a block diagram that illustrates an example of a functional configuration of a first signal processing apparatus 12. The first signal processing apparatus 12 is an example of a signal processing apparatus.

The first signal processing apparatus 12 includes the composition unit 10A, the signal processing unit 10B, a first signal adjustment unit 12C, the error calculation unit 10D, the update unit 10E, and a second calculation unit 12G.

The first signal processing apparatus 12 has the same configuration as that of the first signal processing apparatus 10 of the first embodiment, except that the first signal adjustment unit 12C replaces the first signal adjustment unit 10C and that the second calculation unit 12G is further included. Other functions are the same as those illustrated in FIG. 2, the block diagram of the first signal processing apparatus 10 of the first embodiment. Like components are therefore indicated by like reference numerals, and repeated description thereof will be omitted.

The second calculation unit 12G calculates the weighting coefficient based on the error calculated by the error calculation unit 10D.

For example, the second calculation unit 12G increases the weighting coefficient from the previous value if the amount of change in the error is sluggish for a predetermined period of repetition, and conversely decreases the weighting coefficient if the amount of change in the error is large.

For example, the second calculation unit 12G calculates a new weighting coefficient by the following formula (6) that uses the gradient obtained by the partial derivative of the error with respect to the weighting coefficient.

$$k' = k - \eta \frac{\partial E(W, k)}{\partial k} \qquad (6)$$

In the formula (6), k' denotes a new weighting coefficient after update, k denotes the weighting coefficient before update, that is, a previously calculated weighting coefficient, and η is a coefficient for determining the amount of update. Furthermore, W represents the network parameter W (weight matrix).

The formula (6) represents an example where the weighting coefficient is updated by gradient descent. The second calculation unit 12G may calculate the new weighting coefficient "k'" using any optimization algorithm for iterative optimization.

Furthermore, the formula (6) gives an example where the weighting coefficient is a scalar value. For a vector and a matrix having two or more weighting coefficients, the second calculation unit 12G may calculate the new weighting coefficient "k'" using a formula similar with the formula (6).

The first signal adjustment unit 12C multiplies at least one of the first signal 20 and the first restoration signal 26 by the weighting coefficient calculated by the second calculation unit 12G and outputs the corrected first signal 28 and the corrected first restoration signal 29 to the error calculation unit 10D. In other words, the first signal adjustment unit 12C multiplies at least one of the first signal 20 and the first restoration signal 26 by the new weighting coefficient "k'" updated by the second calculation unit 12G.

The processing performed by the first signal adjustment unit 11C is the same as that performed by the first signal adjustment unit 10C of the first embodiment, except that the weighting coefficient received from the second calculation unit 12G is used instead of a predetermined weighting coefficient.

An example flow of signal processing performed by the first signal processing apparatus 12 will now be described. The signal processing performed by the first signal processing apparatus 11 is parameter learning processing.

Figure 8:
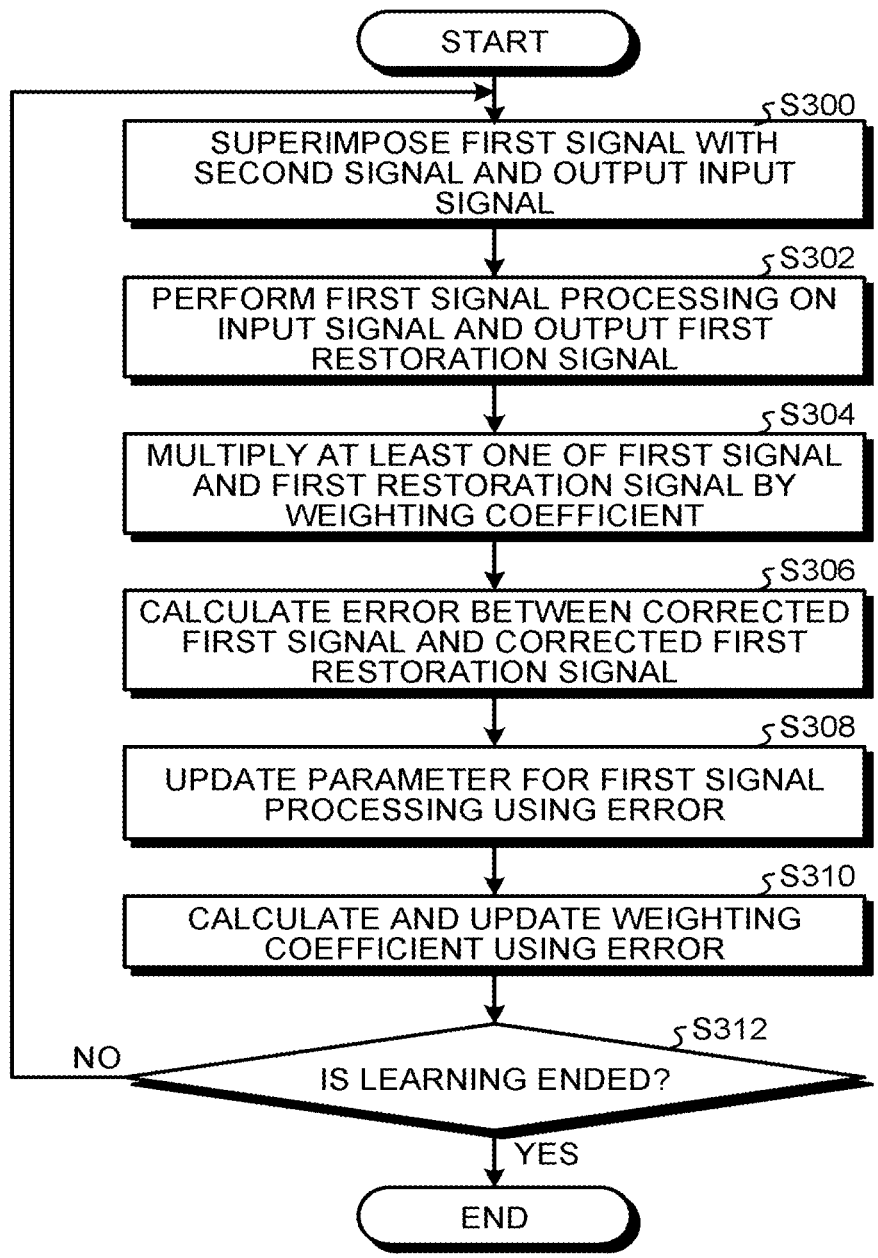
FIG. 8 is a flowchart of signal processing according to the third embodiment.

FIG. 8 is a flowchart of example signal processing performed by the first signal processing apparatus 12.

Steps S300 to S308 are the same as Steps S100 to S108 in the first signal processing apparatus 10 of the first embodiment (see FIG. 4). Description thereof thus will be omitted.

The second calculation unit 12G calculates a new weighting coefficient based on the error calculated at Step S306 and updates the weighting coefficient to the new one (Step S310). In the next processing, the first signal adjustment unit 12C multiplies at least one of the first signal 20 and the first restoration signal 26 by the weighting coefficient calculated and updated at Step S310 and outputs the corrected first signal 28 and the corrected first restoration signal 29.

For the first processing, the first signal adjustment unit 12C may use a predetermined weighting coefficient. The first signal processing apparatus 12 may use a new weighting coefficient received from the second calculation unit 12G in the next and future processing events.

The first signal processing apparatus 12 performs the processing of Step S312 as performed at above Step S110 and ends this routine.

As described above, in the first signal processing apparatus 12 of the third embodiment, the second calculation unit 12G calculates the weighting coefficient based on the error between the corrected first signal 28 and the corrected first restoration signal 29. The first signal adjustment unit 12C multiplies at least one of the first signal 20 and the first restoration signal 26 by the calculated weighting coefficient and outputs the corrected first signal 28 and the corrected first restoration signal 29.

The first signal processing apparatus 11 of the third embodiment can therefore calculate and update the weighting coefficient in a dynamic fashion such that the weighting coefficient satisfies the above relation described in the first embodiment, using the first signal 20 and the second signal 22.

In addition to the effects of the first embodiment, a first signal processing apparatus 13 of the third embodiment is further advantageous in decreasing unnecessary components (the second signal 22) of the input signal 24 while controlling a reduction in the necessary signal component (the first signal 20) of the input signal 24.

Fourth Embodiment

In a fourth embodiment, the second signal processing apparatus 30 included in the signal processing system 1 will be described (see FIG. 1).

Figure 9:
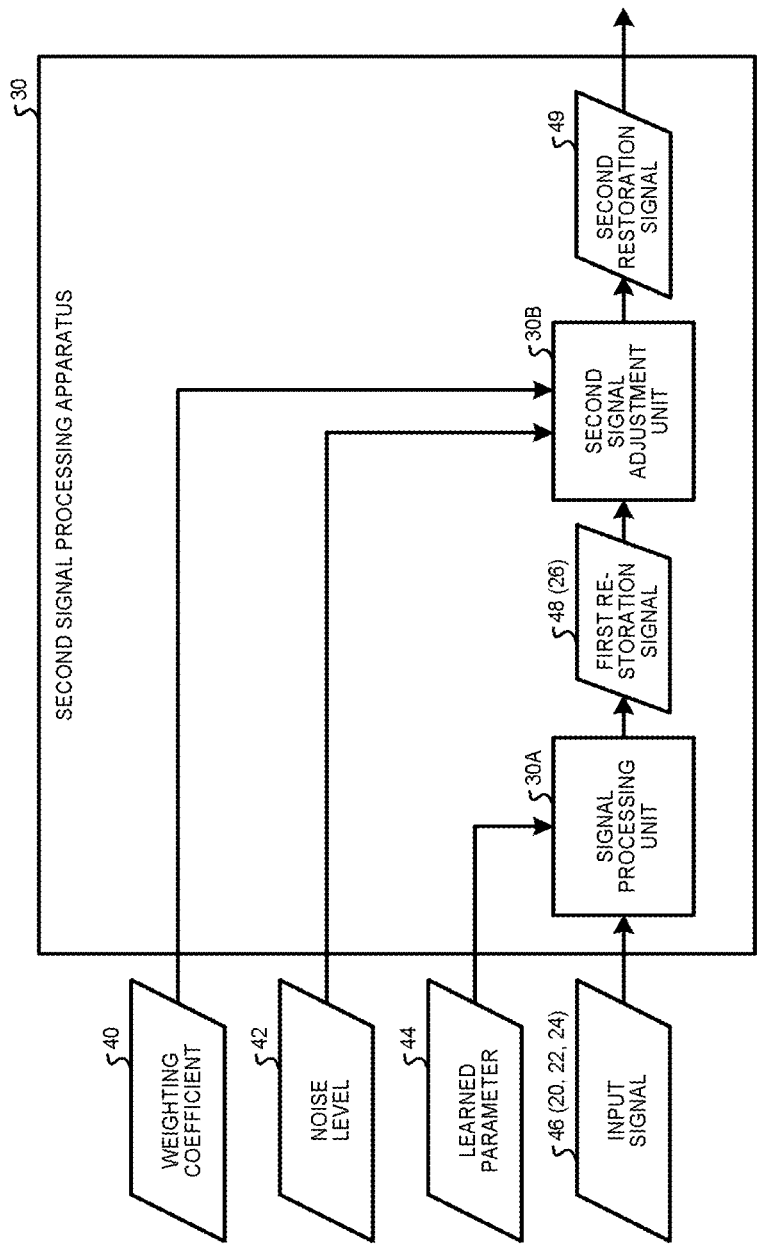
FIG. 9 is a block diagram that illustrates a functional configuration of a second signal processing apparatus according to a fourth embodiment.

FIG. 9 is a block diagram that illustrates an example of a functional configuration of the second signal processing apparatus 30. The second signal processing apparatus 30 includes a signal processing unit 30A and a second signal adjustment unit 30B.

The signal processing unit 30A and the second signal adjustment unit 30B are implemented by one processor or a plurality of processors. For example, the above units may be implemented by causing a processor, such as a central processing unit (CPU), to execute a computer program, which means, by software, or may be implemented by a processor such as a dedicated integrated circuit (IC), which means, by hardware. The units may be implemented by a combination of software and hardware. In using a plurality of processors, each processor may implement one of the units or may implement two or more units.

The signal processing unit 30A generates, from an input signal 46, a first restoration signal 48 by restoring the first signal 20 included in the input signal 46.

The input signal 46 is similar with the input signal 24 described in the above embodiments. The input signal 46 is a signal in which the second signal 22 is superimposed on the first signal 20.

The input signal 46 for the second signal processing apparatus 30 of the fourth embodiment is not a signal composed by the composition unit 10A. The signal is acquired from an external apparatus or an external environment by the second signal processing apparatus 30 for the recognition processing of the second signal processing apparatus 30.

The signal processing unit 30A acquires a learned parameter 44, learned by the first signal processing apparatus 10, the first signal processing apparatus 11, or the first signal processing apparatus 12, and stores the parameter. For example, the signal processing unit 30A may directly acquire the learned parameter 44 from the first signal processing apparatus 10, the first signal processing apparatus 11, or the first signal processing apparatus 12 in a wired or wireless manner, or via, for example, another apparatus.

The signal processing unit 30A performs the first signal processing on the input signal 46 using the learned parameter 44 and outputs the first restoration signal 48.

The signal processing unit 30A performs processing on the input signal 46, instead of the input signal 24, using the learned parameter 44. Other processes from restoring the first restoration signal 48 to outputting the signal are the same as those of the signal processing unit 10B of the above embodiments.

The first restoration signal 48 is a signal restored from the input signal 46 instead of the input signal 24. Other structure is the same as that of the first restoration signal 26.

The second signal adjustment unit 30B multiplies the first restoration signal 48 by a corrected weighting coefficient, created based on the weighting coefficient used by the first signal processing apparatus (the first signal processing apparatus 10, the first signal processing apparatus 11, or the first signal processing apparatus 12) for learning of the learned parameter 44, and outputs a resulting second restoration signal 49.

More specifically, the second signal adjustment unit 30B acquires, from the first signal processing apparatus (the first signal processing apparatus 10, the first signal processing apparatus 11, or the first signal processing apparatus 12) having created the learned parameter 44 for use by the signal processing unit 30A, a weighting coefficient 40 used by the first signal processing apparatus for learning of the learned parameter 44. The weighting coefficient 40 for learning is the coefficient used by the first signal adjustment unit 10C (or the first signal adjustment unit 11C, or the first signal adjustment unit 12C) of the first signal processing apparatus for calculation of the learned parameter 44.

The second signal adjustment unit 30B further receives, from the first signal processing apparatus (the first signal processing apparatus 10, the first signal processing apparatus 11, or the first signal processing apparatus 12) having created the learned parameter 44 for use by the signal processing unit 30A, a noise level 42 used by the first signal processing apparatus for learning of the learned parameter 44. The noise level 42 for learning is the noise level of the input signal 24 used by the first signal adjustment unit 10C (or the first signal adjustment unit 11C, or the first signal adjustment unit 12C) of the first signal processing apparatus for calculation of the learned parameter 44.

The noise level 42 is given as the power ratio between the first signal 20 and the second signal 22 contained in the input signal 24.

The second signal adjustment unit 30B may directly acquire the weighting coefficient 40 and the noise level 42 from the first signal processing apparatus 10, the first signal processing apparatus 11, or the first signal processing apparatus 12 in a wired or wireless manner, or via, for example, another apparatus.

The second signal adjustment unit 30B derives a corrected weighting coefficient from the acquired weighting coefficient 40.

For example, the second signal adjustment unit 30B derives, as the corrected weighting coefficient, a multiplicative inverse of the weighting coefficient 40. The second signal adjustment unit 30B multiplies the first restoration signal 48 by the corrected weighting coefficient and generates the second restoration signal 49. This processing enables the scales (units) of the input signal 46 and the second restoration signal 49 to be unified.

As a noise level 42 increases, the scale of the second restoration signal 49 tends to be restored as a smaller value than a true value of the first signal 20. As such, the second signal adjustment unit 30B may derive, as the corrected weighting coefficient, a result obtained by multiplying the weighting coefficient 40 at learning by a correction coefficient based on the noise level 42.

Namely, the second signal adjustment unit 30B may derive the corrected weighting coefficient obtained by correcting the weighting coefficient 40 using the noise level 42 as the power ratio between the first signal 20 and the second signal 22, and output the second restoration signal 49 obtained by multiplying the first restoration signal 48 by the resulting corrected weighting coefficient.

In this manner, the second signal adjustment unit 30B outputs the second restoration signal 49. The second signal processing apparatus 30 may further perform recognition processing on the second restoration signal 49. The recognition processing has been described in the first embodiment, and repeated description thereof will be omitted.

An example flow of signal processing performed by the second signal processing apparatus 30 will now be described.

Figure 10:
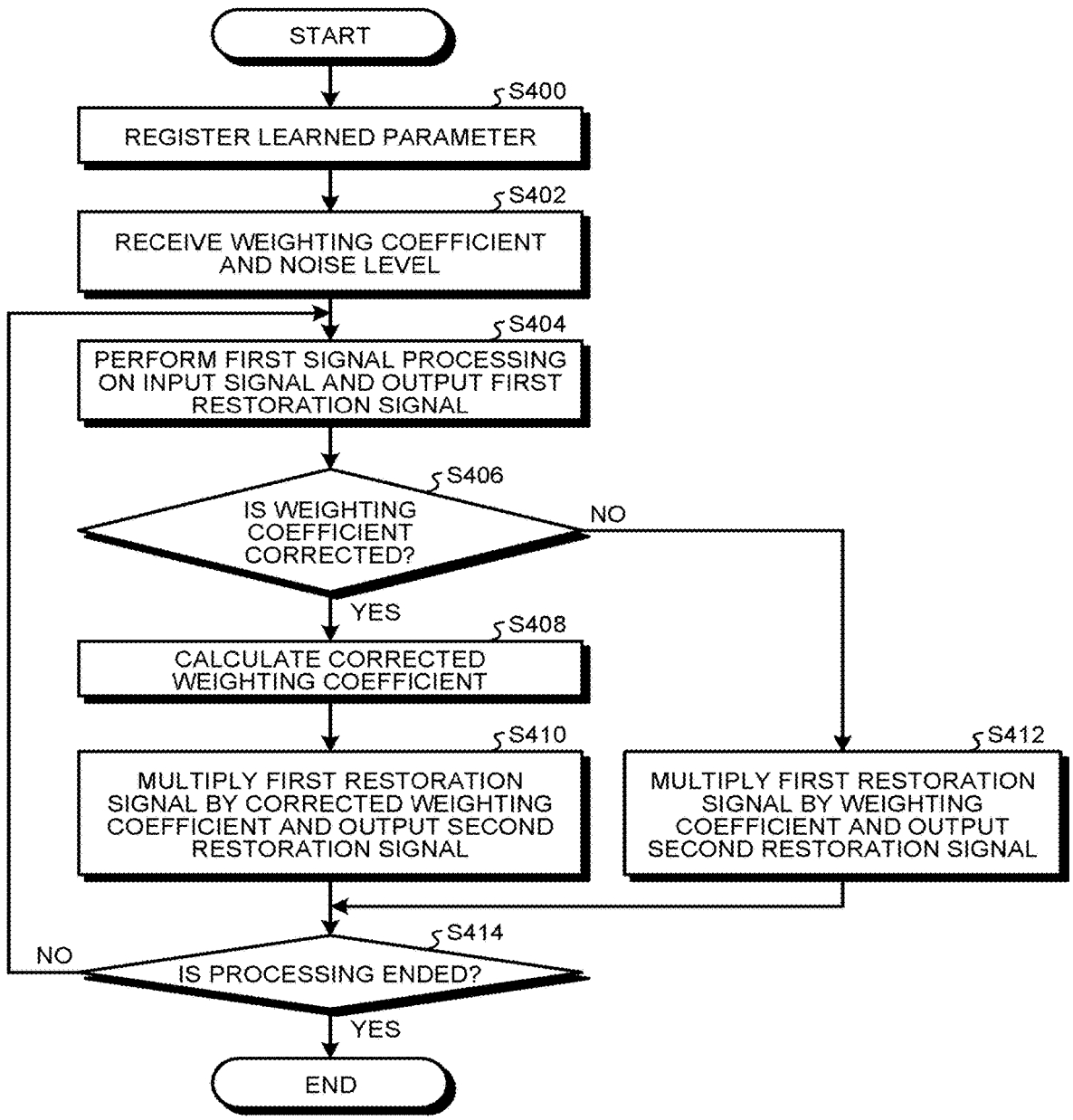
FIG. 10 is a flowchart of signal processing according to the fourth embodiment.

FIG. 10 is a flowchart of example signal processing performed by the second signal processing apparatus 30.

The signal processing unit 30A registers the learned parameter 44 (Step S400). The second signal adjustment unit 30B receives the weighting coefficient 40 and the noise level 42, based on which the learned parameter 44 registered at Step S400 has been calculated (Step S402).

The signal processing unit 30A performs the first signal processing on the input signal 46 using the learned parameter 44 and outputs the first restoration signal 48 (Step S404).

The second signal adjustment unit 30B determines whether to correct the weighting coefficient 40 registered at Step S400 (Step S406). For example, the second signal adjustment unit 30B determines to correct, if the noise level 42 received at Step S402 is equal to or greater than a predetermined threshold, and determines not to correct if the noise level 42 is under the threshold.

If the determination is positive at Step S406 (Yes at Step S406), the processing proceeds to Step S408. At Step S408, the second signal adjustment unit 30B corrects the weighting coefficient 40 and calculates a corrected weighting coefficient (Step S408). The second signal adjustment unit 30B multiplies the first restoration signal 48 by the corrected weighting coefficient calculated at Step S408, and outputs the second restoration signal 49 (Step S410).

If the determination is negative at Step S406 (No at Step S406), the processing proceeds to Step S412. At Step S412, the second signal adjustment unit 30B multiplies the first restoration signal 48 by the weighting coefficient 40, and outputs the second restoration signal 49 (Step S410).

The second signal processing apparatus 30 determines whether to end the signal processing (Step S414). For example, the second signal processing apparatus 30 makes the determination of Step S414 by determining whether any signal to complete the processing is received, for example, through the user's operation instruction. If the determination is negative at Step S414 (No at Step S414), the processing returns to Step S404. If the determination is negative at Step S414 (No at Step S414), the processing may return to Step S400. If the determination is positive at Step S414 (Yes at Step S414), this routine ends.

As described above, the second signal adjustment unit 30B of the second signal processing apparatus 30 of the fourth embodiment multiplies the first restoration signal 48, restored using the learned parameter 44, by the corrected weighting coefficient obtained by correcting the weighting coefficient 40 used by the signal processing unit 10B (the first signal processing unit), and outputs the second restoration signal 49.

The second signal adjustment unit 30B of the fourth embodiment restores the first restoration signal 48 from the input signal 46 using the learned parameter 44, calculated based on the error between the corrected first signal 28 and the corrected first restoration signal 29 multiplied by the weighting coefficient, instead of the error between the first signal 20 and the first restoration signal 26. Furthermore, the second signal processing apparatus 30 of the fourth embodiment corrects the first restoration signal 48 using a corrected weighting coefficient obtained by correcting the weighting coefficient 40 and outputs the second restoration signal 49.

In addition to the effects of the first embodiment, the second signal processing apparatus 30 of the fourth embodiment is advantageous in outputting the second restoration signal 49 brought to the same scale (unit) as that of the input signal 46.

At least some of the functions of the second signal processing apparatus 30 may be included in the first signal processing apparatus 10, the first signal processing apparatus 11, or the first signal processing apparatus 12.

For example, the first signal processing apparatus 10 (see FIG. 2) may include the signal processing unit 30A and the second signal adjustment unit 30B. In this configuration, the signal processing unit 30A receives the learned parameter 44 obtained through the processes of the signal processing unit 10B, the first signal adjustment unit 10C, the update unit 10E, and the update unit 10E, and performs the first signal processing on the input signal 24 or the separately acquired input signal 46.

Fifth Embodiment

In a fifth embodiment, a second signal processing apparatus 31 will be described. The second signal processing apparatus 31 is another example of a second signal processing apparatus of the signal processing system 1 that is different from the second signal processing apparatus 30 of the fourth embodiment.

Figure 11:
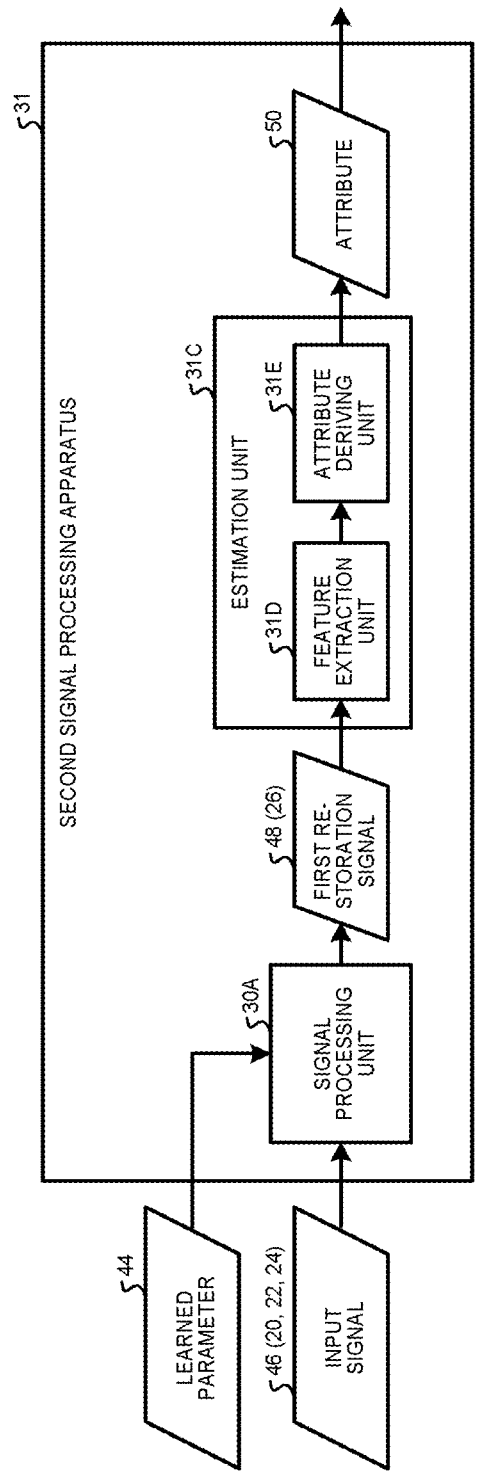
FIG. 11 is a block diagram that illustrates a functional configuration of a second signal processing apparatus according to a fifth embodiment.

FIG. 11 is a block diagram that illustrates an example of a functional configuration of the second signal processing apparatus 31. The second signal processing apparatus 31 includes the signal processing unit 30A and an estimation unit 31C. The estimation unit 31C includes a feature extraction unit 31D and an attribute deriving unit 31E.

The signal processing unit 30A, the estimation unit 31C, the feature extraction unit 31D, and the attribute deriving unit 31E are implemented by, for example, one processor or a plurality of processors. For example, the above units may be implemented by causing a processor, such as a central processing unit (CPU), to execute a computer program, which means, by software, or may be implemented by a processor such as a dedicated integrated circuit (IC), which means, by hardware. The units may be implemented by a combination of software and hardware. In using a plurality of processors, each processor may implement one of the units or may implement two or more units.

The signal processing unit 30A has the same configuration as that of the signal processing unit 30A of the fourth embodiment, and detailed description thereof will be omitted.

The estimation unit 31C performs recognition processing on the first restoration signal 48. Examples of recognition processing include, as described in the first embodiment, image classification, image recognition, image segmentation, image captioning, classification processing on a one-dimensional signal such as an electrical signal and vibrations, and machine translation of speech.

In the fifth embodiment, the estimation unit 31C estimates an attribute 50 of feature information of the first restoration signal 48. The attribute 50 is various types of information specified based on the results of recognition processing. Extraction of feature information and estimation of the attribute 50 correspond to the above recognition processing.

The estimation unit 31C includes the feature extraction unit 31D and the attribute deriving unit 31E.

The feature extraction unit 31D extracts the feature of the first restoration signal 48 and outputs feature information in the form of a signal of the extracted feature. For example, as the recognition processing, the feature extraction unit 31D performs at least one of quantization and sampling on the first restoration signal 48.

FIG. 12A to FIG. 12D are exemplary diagrams illustrating extraction of feature information 64. In FIG. 12A to FIG. 12D, the first restoration signal 48 is, for example, a signal representing partial discharging.

Figure 12A:
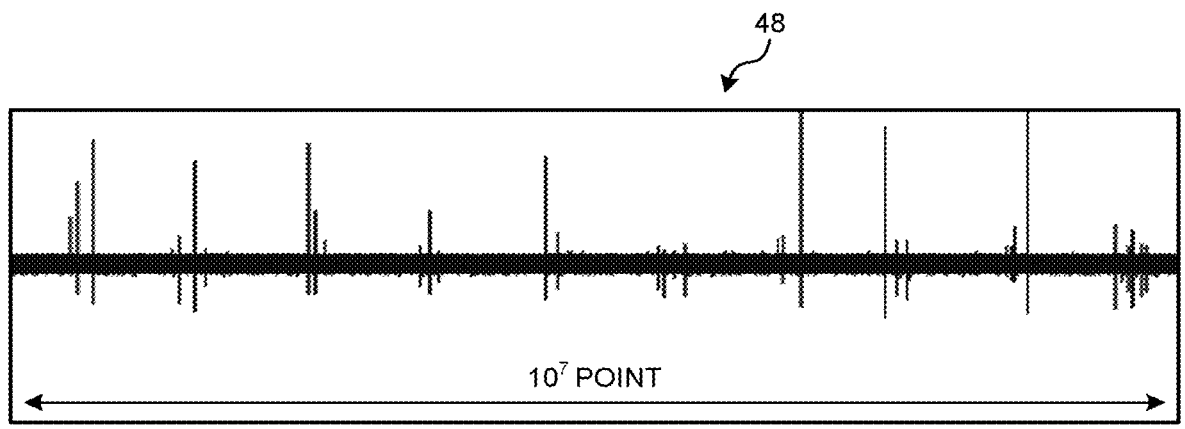
FIG. 12A is an illustrative diagram of extraction of feature information according to the fifth embodiment.

FIG. 12A illustrates an example of the first restoration signal 48. The feature extraction unit 31D outputs two signals 60, in which maximum values 60A and minimum values 60B for each predetermined range are arranged, with respect to the first restoration signal 48 (see FIG. 12B). For example, the feature extraction unit 31D outputs the signals 60, in which the maximum values 60A and the minimum values 60B are arranged, by sampling (downsampling) the first restoration signal 48.

Figure 12B:
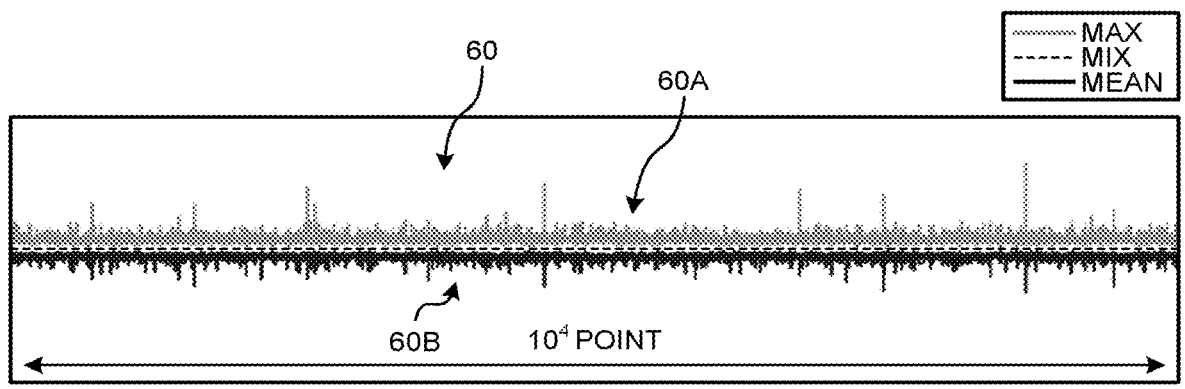
FIG. 12B is another illustrative diagram of extraction of feature information according to the fifth embodiment.

The feature extraction unit 31D then normalizes each of the two signals 60 (a set of the maximum values 60A and a set of the minimum values 60B) to set the maximum amplitude value at "1" (see FIG. 12B). The two signals 60 each are normalized such that the maximum amplitude value is set at "1".

Figure 12C:
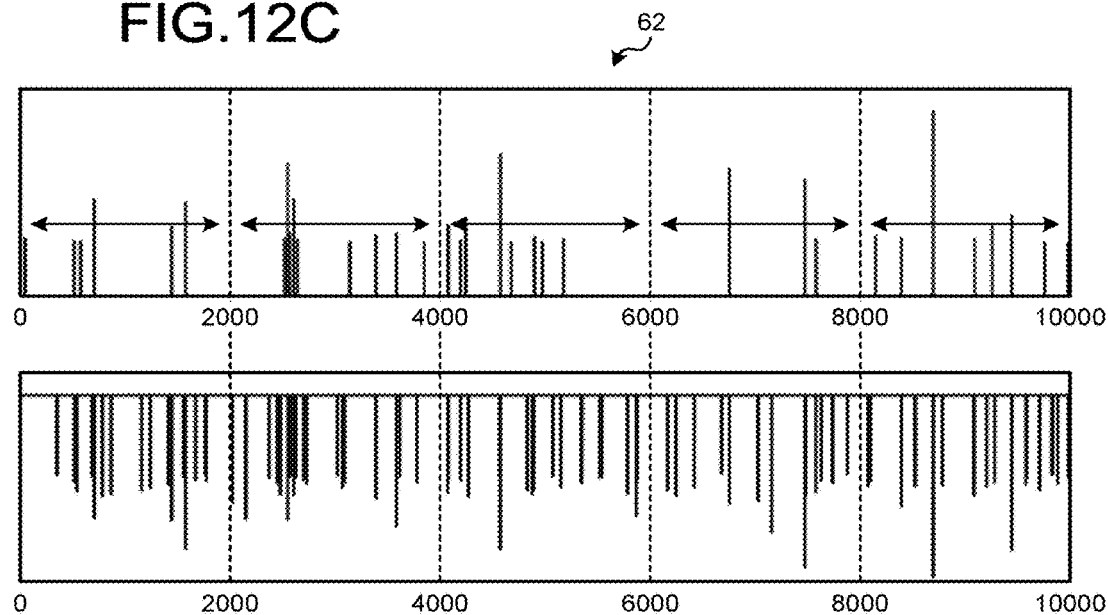
FIG. 12C is still another illustrative diagram of extraction of feature information according to the fifth embodiment.
Figure 12D:
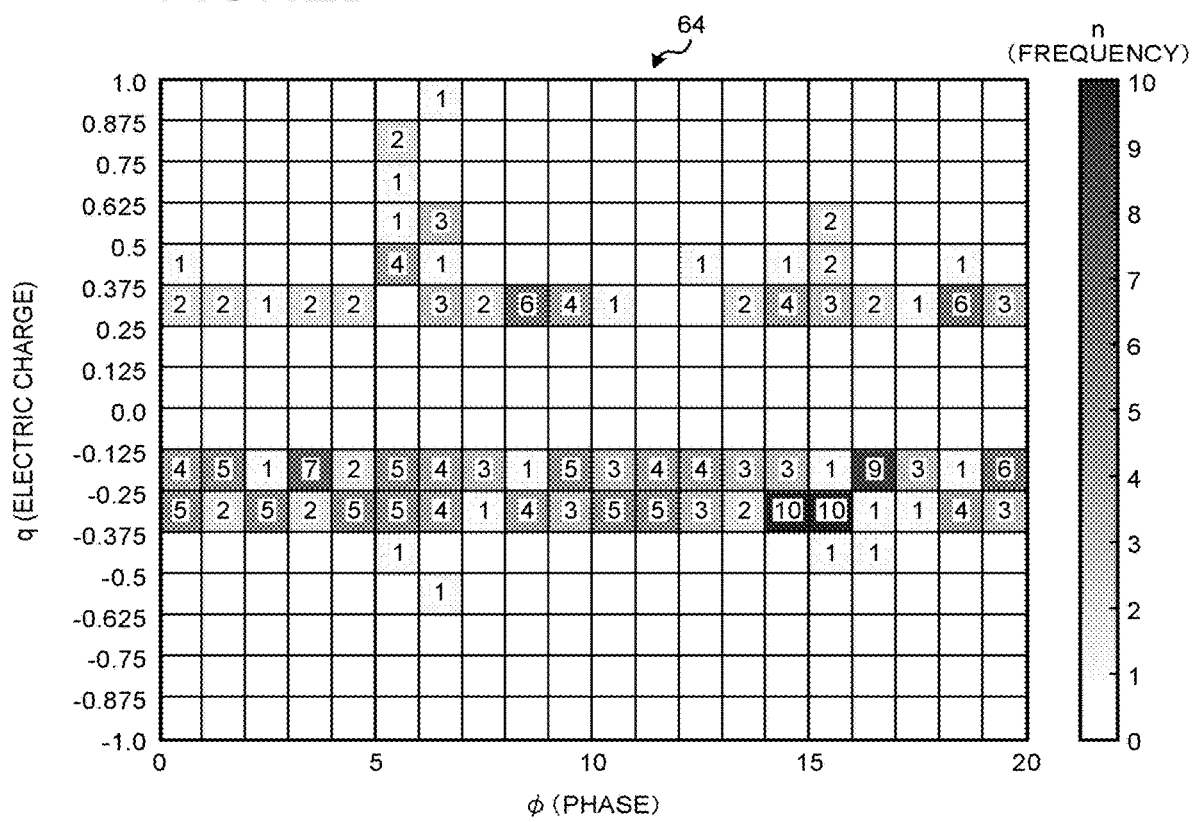
FIG. 12D is still another illustrative diagram of extraction of feature information according to the fifth embodiment.

With respect to the normalized signal 60, the feature extraction unit 31D converts a signal equal to or lower than a predetermined threshold into "0" to obtain a post-thresholding signal 62 (see FIG. 12C).

To extract the feature information 64 of the post-thresholding signal 62, the feature extraction unit 31D quantifies the signal 62 by the quantity per cell, with the abscissa representing $\varphi$ (phase) and the ordinate q (electric charge). More specifically, the feature extraction unit 31D extracts the feature information 64, which is the results of recognition processing, from the signal 62 by performing segmentation by period, superimposing, and quantization on the signal.

With the above processing, the feature extraction unit 31D extracts the feature information 64 expressed in a $\varphi$-q-n pattern, where $\varphi$ is phase, q is electric charge, and n is frequency. The feature information 64 is, however, not limited to the $\varphi$-q-n pattern.

Referring back to FIG. 11, the attribute deriving unit 31E derives the attribute 50 of the first restoration signal 48 using the feature information 64. As described above, the attribute 50 is various types of information specified based on the feature information 64 (results of recognition processing). The attribute 50 may include, for example, the source of the input signal 46 (for example, a failure portion of the apparatus) and the operation state of the source of the input signal 46 (for example, the failure state).

An example flow of signal processing performed by the second signal processing apparatus 31 will now be described.

Figure 13:
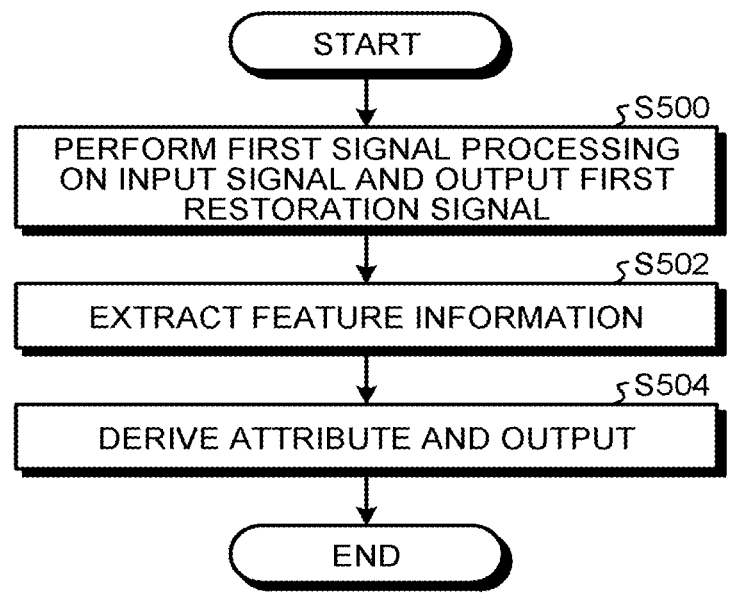
FIG. 13 is a flowchart of signal processing according to the fifth embodiment.

FIG. 13 is a flowchart of example signal processing performed by the second signal processing apparatus 31.

The signal processing unit 30A performs the first signal processing on the input signal 46 using the learned parameter 44 and outputs the first restoration signal 48 (Step S500).

The feature extraction unit 31D extracts the feature information 64 from the first restoration signal 48 output at Step S500 (Step S502).

The attribute deriving unit 31E derives the attribute 50 from the feature information 64 extracted at Step S502 and outputs the attribute 50 (Step S504), and this routine ends.

As described above, the second signal processing apparatus 31 of the fifth embodiment estimates the attribute 50 of the feature information 64 of the first restoration signal 48 restored using the learned parameter 44.

In the fifth embodiment, recognition processing to estimate the attribute 50 is performed on the accurately restored first restoration signal 48.

In addition to the effects of the first embodiment, the second signal processing apparatus 31 of the fifth embodiment is further advantageous in performing the recognition processing on the accurately restored first restoration signal 48.

At least some of the functions of the second signal processing apparatus 31 may be included in the first signal processing apparatus 10, the first signal processing apparatus 11, or the first signal processing apparatus 12.

For example, the first signal processing apparatus 10 (see FIG. 2) may include the signal processing unit 30A and the estimation unit 31C. In this configuration, the signal processing unit 30A receives the learned parameter 44 obtained through the processes of the signal processing unit 10B, the first signal adjustment unit 10C, the update unit 10E, and the update unit 10E, and performs the first signal processing on the input signal 24 or the separately acquired input signal 46.

At least some of the functions of the second signal processing apparatus 31 may be included in the second signal processing apparatus 30 (FIG. 9). In this configuration, for example, the second signal processing apparatus 30 may include the estimation unit 31C. The second signal processing apparatus 31 may receive the second restoration signal 49 from the second signal adjustment unit 30B, instead of the signal processing unit 30A, and estimate the attribute 50 of the second restoration signal 49.

An example hardware configuration of the first signal processing apparatus 10, the first signal processing apparatus 11, the first signal processing apparatus 12, the second signal processing apparatus 30, and the second signal processing apparatus 31 of the above embodiments will now be described.

Figure 14:
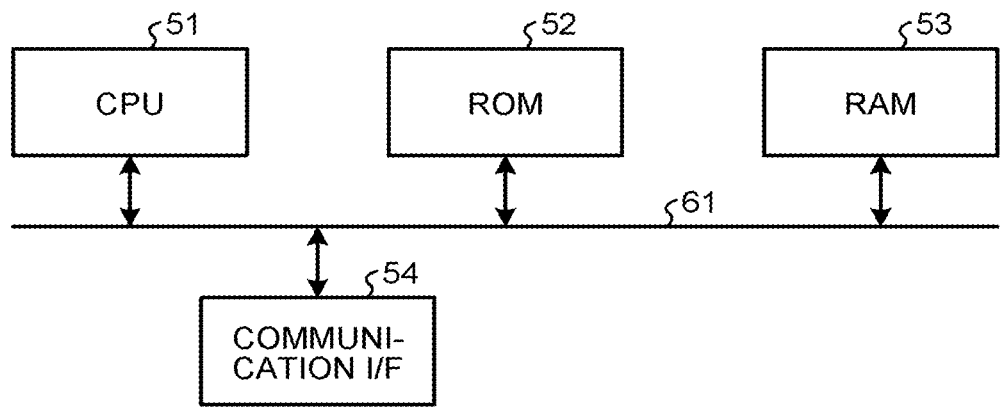
FIG. 14 is a diagram of a hardware configuration shared by the signal processing apparatuses according to the first to the fifth embodiments.

FIG. 14 is an illustrative diagram of an example hardware configuration of the first signal processing apparatus 10, the first signal processing apparatus 11, the first signal processing apparatus 12, the second signal processing apparatus 30, and the second signal processing apparatus 31 of the above embodiments.

The first signal processing apparatus 10, the first signal processing apparatus 11, the first signal processing apparatus 12, the second signal processing apparatus 30, and the second signal processing apparatus 31 of the above embodiments include a controller such as a CPU 51, a storage such as a read only memory (ROM) 52 and a RAM 53, a communication interface (I/F) 54 connected to a network to establish communication, and a bus 61 that connects these units.

Computer programs executed by the first signal processing apparatus 10, the first signal processing apparatus 11, the first signal processing apparatus 12, the second signal processing apparatus 30, and the second signal processing apparatus 31 of the embodiments are previously stored in the ROM 52 and other devices and provided.

Computer programs executed by the first signal processing apparatus 10, the first signal processing apparatus 11, the first signal processing apparatus 12, the second signal processing apparatus 30, and the second signal processing apparatus 31 of the embodiments may be stored in a computer-readable memory medium such as a compact disc read only memory (CD-ROM), a flexible disk (FD), a compact disc recordable (CD-R), and a digital versatile disc (DVD) as an installable or an executable file and provided as computer program products.

Computer programs executed by the first signal processing apparatus 10, the first signal processing apparatus 11, the first signal processing apparatus 12, the second signal processing apparatus 30, and the second signal processing apparatus 31 of the embodiments may be stored in a computer connected to a network such as the Internet and provided by being downloaded via the network. The computer programs executed by the signal processing apparatuses of the first to the third embodiments may be provided or distributed via a network such as the Internet.

The computer programs executed by the signal processing apparatuses of the first to the third embodiments allow a computer to function as the above units of the signal processing apparatuses. The computer further allows the CPU 51 to load a computer program from a computer-readable memory medium onto a main storage and to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing apparatus, comprising:
processing circuitry configured to function as:
a signal processing unit configured to perform first signal processing on an input signal in which a second signal is superimposed on a first signal, the first signal processing being performed using a plurality of parameters, and to output a first restoration signal obtained by restoring the first signal using the first signal processing;
a first signal adjustment unit configured to receive the first signal and the first restoration signal as inputs, multiply both of the first signal and the first restoration signal that are input by respective weighting coefficients, and output a corrected first signal and a corrected first restoration signal; and
an update unit configured to update the plurality of parameters using an error between the corrected first signal and the corrected first restoration signal output from the first adjustment unit, wherein the weighting coefficients are expressed by a matrix with coefficients arranged on a main diagonal, and the respective weighting coefficients used by the first signal adjustment unit are set to make the error larger than a signal strength of the second signal.

2. The apparatus according to claim 1, wherein the signal processing unit is further configured to perform the first signal processing, which is a combination of linear transformation and nonlinear transformation on the input signal.

3. The apparatus according to claim 2, wherein the signal processing unit is further configured to perform the first signal processing using a neural network.

4. The apparatus according to claim 1, wherein the processing circuitry is further configured to function as:
a first calculation unit configured to calculate the respective weighting coefficients based at least on one of first statistical information of the first signal and second statistical information of the second signal, wherein
the first signal adjustment unit is further configured to multiply both of the first signal and the first restoration signal by the respective weighting coefficients.

5. The apparatus according to claim 1, wherein the processing circuitry is further configured to function as:
a second calculation unit configured to calculate the weighting coefficients based on the error, wherein
the first signal adjustment unit is further configured to multiply both of the first signal and the first restoration signal by the respective weighting coefficients.

6. The apparatus according to claim 1, wherein the processing circuitry is further configured to function as:
a second signal adjustment unit configured to multiply the first restoration signal by a corrected weighting coefficient obtained by correcting one of the weighting coefficients used by the first signal adjustment unit and to output a second restoration signal.

7. The apparatus according to claim 6, wherein
the second signal adjustment unit is further configured to derive the corrected weighting coefficient obtained by correcting the one of the weighting coefficients using a noise level that is a power ratio between the first signal and the second signal, and output the second restoration signal obtained by multiplying the first restoration signal by the corrected weighting coefficient.

8. The apparatus according to claim 1, wherein the processing circuitry is further configured to function as:
an estimation unit configured to estimate an attribute of feature information of the first restoration signal.

9. The apparatus according to claim 1, wherein the second signal is larger than the first signal in at least one of power, amplitude, and variance.

10. The apparatus according to claim 1, wherein the first signal is sparser than the second signal.

11. A signal processing system, comprising:
a first signal processing apparatus; and
a second signal processing apparatus, wherein the first signal processing apparatus comprises first processing circuitry configured to function as:
a signal processing unit configured to perform first signal processing on an input signal in which a second signal is superimposed on a first signal, the first signal processing being performed using a plurality of parameters, and to output a first restoration signal obtained by restoring the first signal using the first signal processing;
a first signal adjustment unit configured to receive the first signal and the first restoration signal as inputs, multiply both of the first signal and the first restoration signal that are input by respective weighting coefficients, and to output a corrected first signal and a corrected first restoration signal; and an update unit configured to update the plurality of parameters using an error between the corrected first signal and the corrected first restoration signal, and
the second signal processing apparatus comprises second processing circuitry configured to function as:
a second signal adjustment unit configured to multiply the first restoration signal by a corrected weighting coefficient obtained by correcting one of the weighting coefficients used by the first signal adjustment unit and to output a second restoration signal, wherein the weighting coefficients are expressed by a matrix with coefficients arranged on a main diagonal, and the respective weighting coefficients used by the first signal adjustment unit are set to make the error larger than a signal strength of the second signal.

12. A signal processing method performed by a computer, the method comprising:
performing first signal processing on an input signal in which a second signal is superimposed on a first signal, the first signal processing being performed using a plurality of parameters, and outputting a first restoration signal obtained by restoring the first signal using the first signal processing;
receiving the first signal and the first restoration signal as inputs;
multiplying both of the first signal and the first restoration signal that are input by respective weighting coefficients, and outputting a corrected first signal and a corrected first restoration signal; and
updating the plurality of parameters using an error between the corrected first signal and the corrected first restoration signal, wherein the weighting coefficients are expressed by matrix with coefficients arranged on a main diagonal, and the respective weighting coefficients in the multiplying step are set to make the error larger than a signal strength of the second signal.

* * * * *